July 4, 1933.  B. M. SHIPLEY  1,916,535

CASH REGISTER

Filed July 9, 1925  15 Sheets-Sheet 1

Inventor
Bernis M. Shipley
By Earl Beust
Henry E. Stauffer
His Attorneys

July 4, 1933.   B. M. SHIPLEY   1,916,535
CASH REGISTER
Filed July 9, 1925   15 Sheets-Sheet 2

July 4, 1933.   B. M. SHIPLEY   1,916,535
CASH REGISTER
Filed July 9, 1925    15 Sheets-Sheet 3

Inventor
Bernis M. Shipley
By Pearl Beust
Henry E. Stauffer
His Attorneys.

July 4, 1933.    B. M. SHIPLEY    1,916,535
CASH REGISTER
Filed July 9, 1925    15 Sheets-Sheet 4

Inventor
Bernis M. Shipley
By Earl Beust
Henry E. Stauffer
His Attorneys

July 4, 1933. B. M. SHIPLEY 1,916,535
CASH REGISTER
Filed July 9, 1925 15 Sheets-Sheet 5
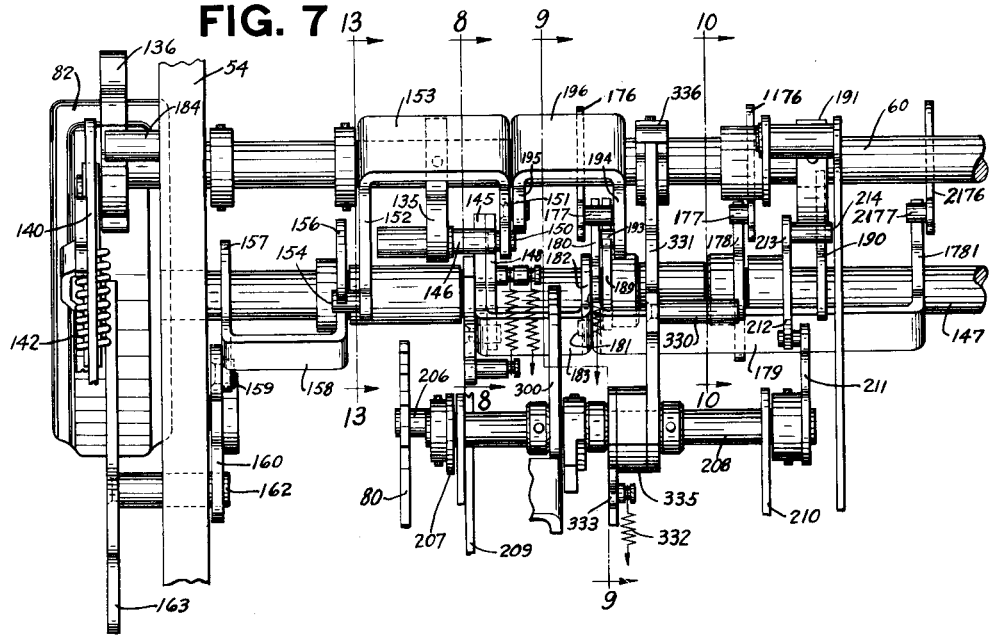
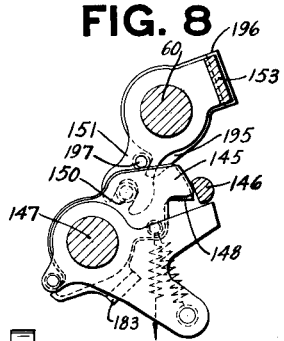
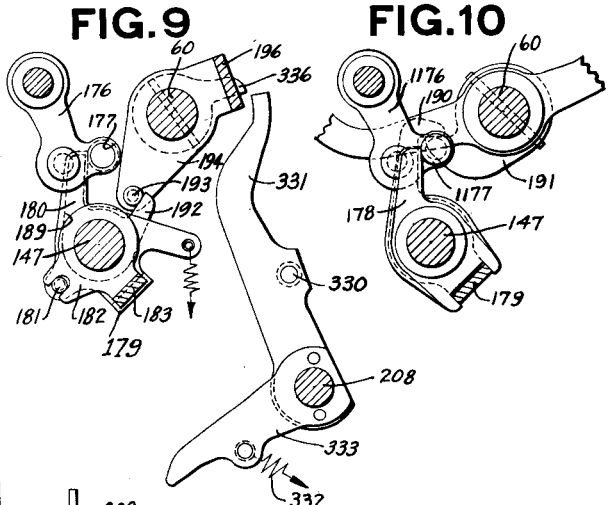
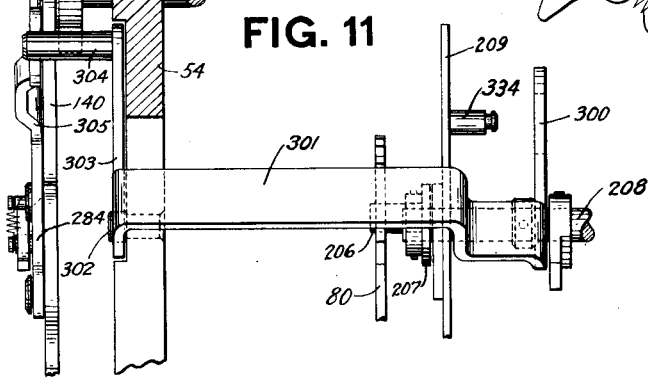
Inventor
Bernis M. Shipley
By *Pearl Benst*
*Henry E. Stauffer*
His Attorneys July 4, 1933.  B. M. SHIPLEY  1,916,535
CASH REGISTER
Filed July 9, 1925  15 Sheets-Sheet 6

Inventor
Bernis M. Shipley
By Earl Benst
Henry E. Stauffer
His Attorneys.

July 4, 1933.  B. M. SHIPLEY  1,916,535
CASH REGISTER
Filed July 9, 1925  15 Sheets-Sheet 7
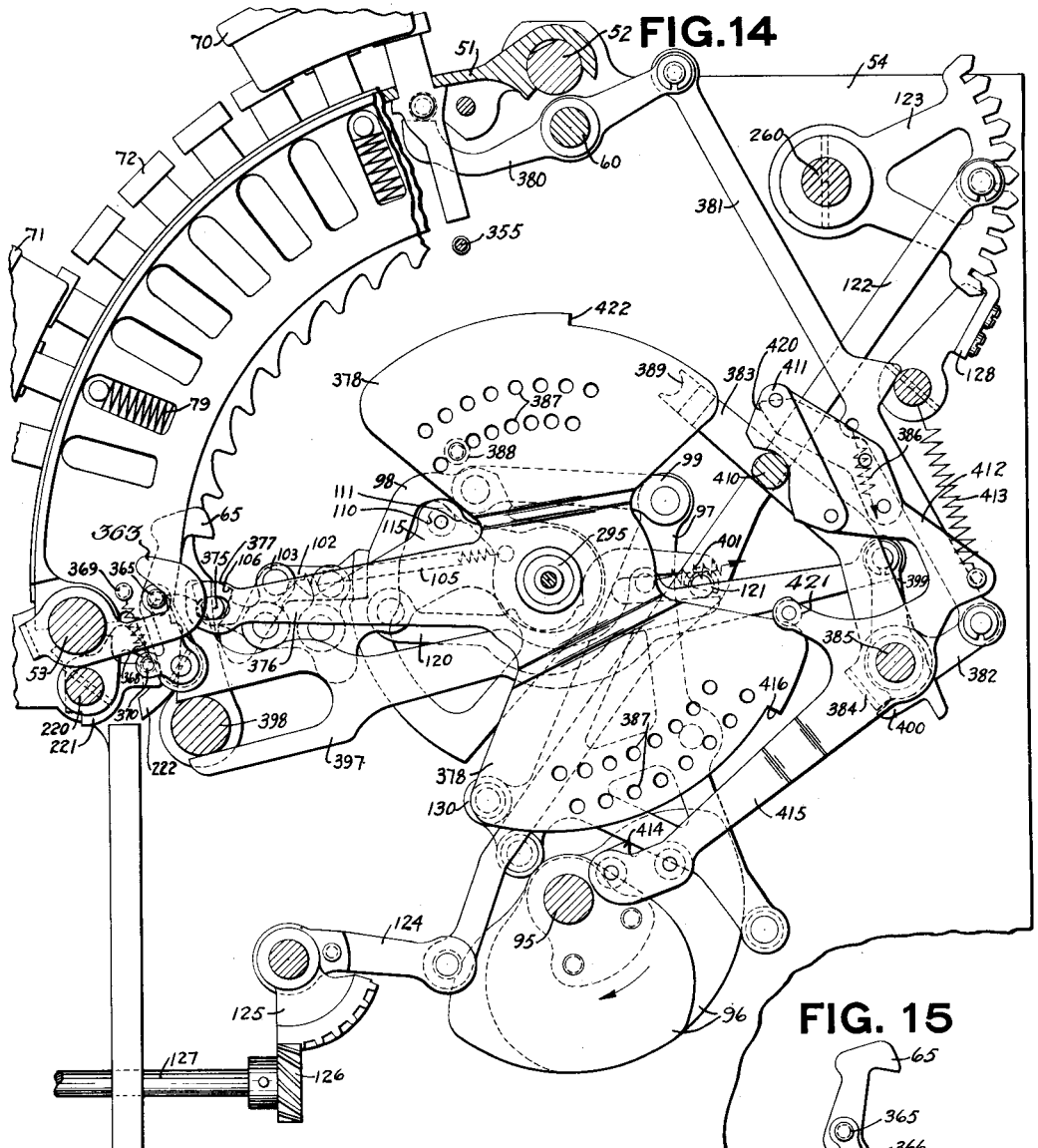
FIG. 14
FIG. 15
FIG. 16
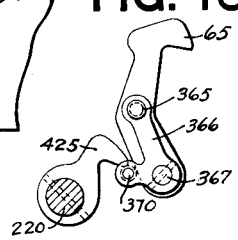
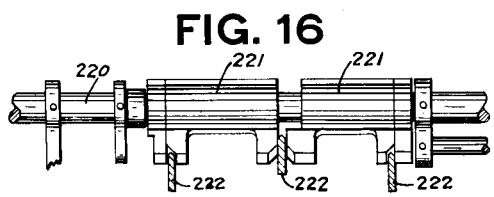
Inventor
Bernis M. Shipley
By Carl Beust
Henry E. Stauffer
His Attorneys

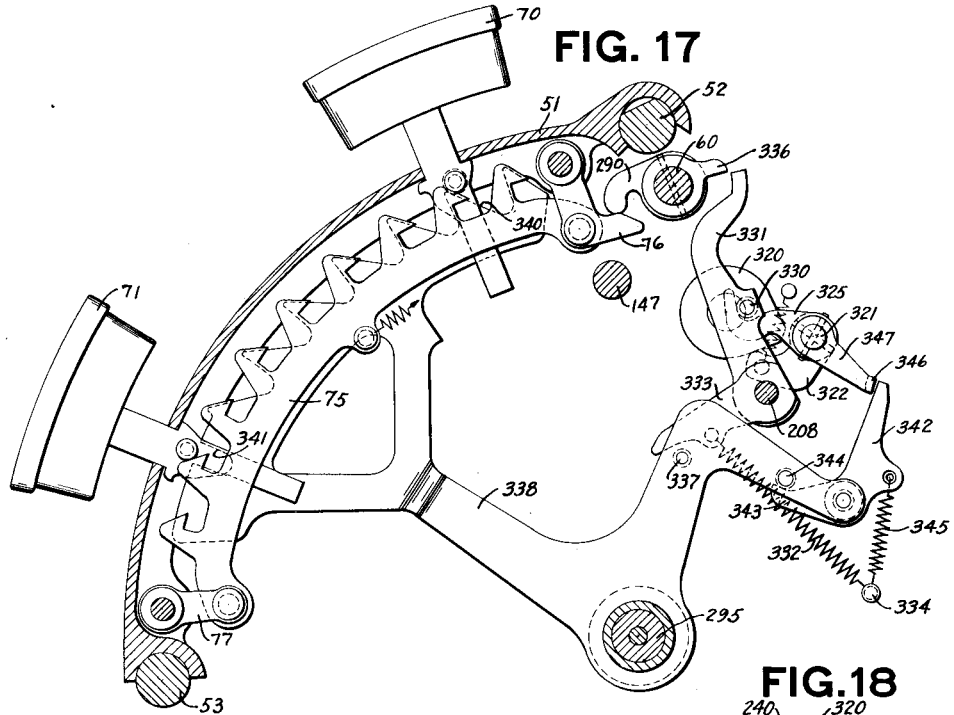
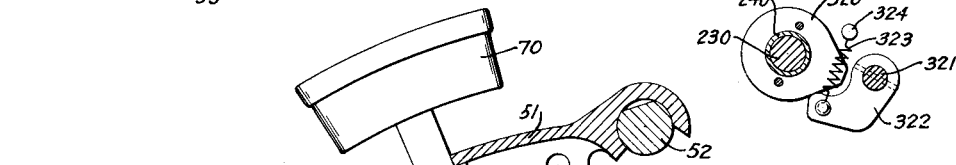
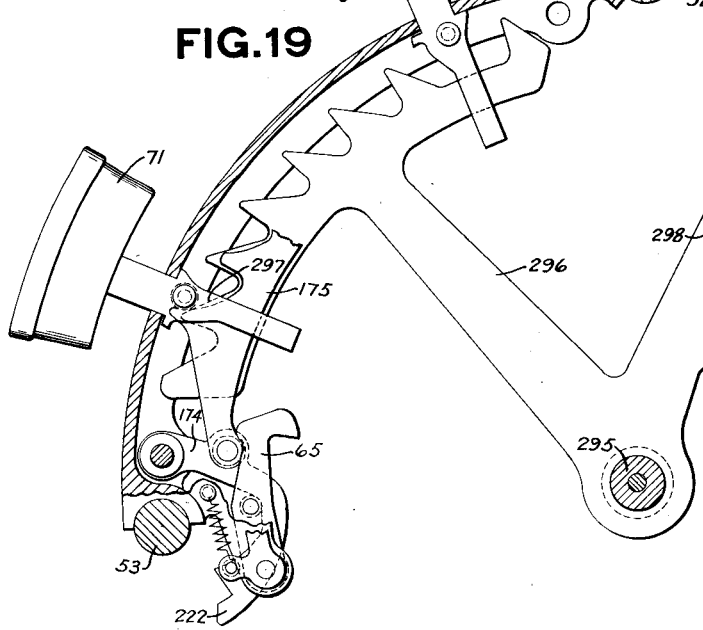

July 4, 1933. B. M. SHIPLEY 1,916,535
CASH REGISTER
Filed July 9, 1925 15 Sheets-Sheet 9

Inventor
Bernis M. Shipley
By Carl Benst
Henry E Stauffer
His Attorneys

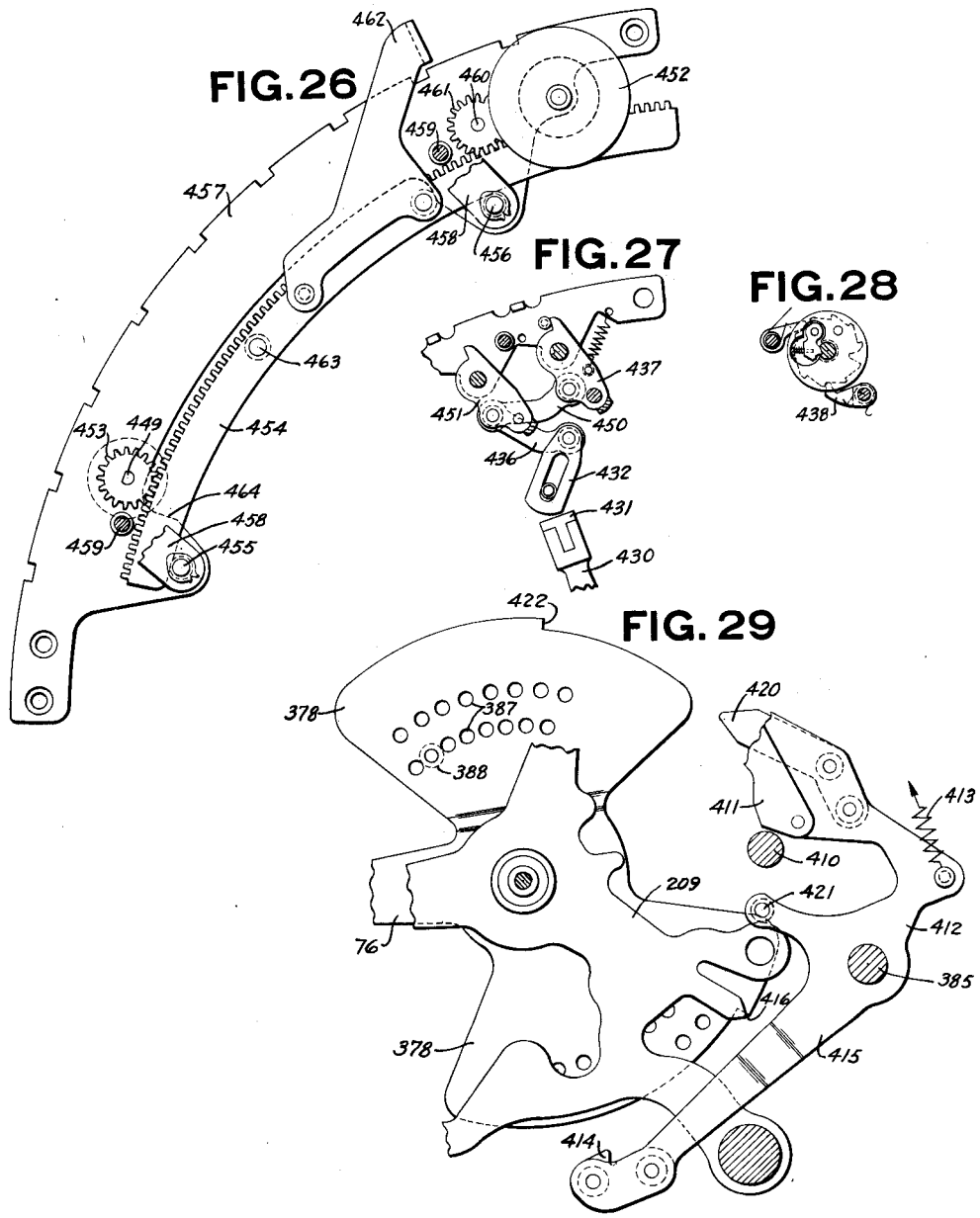
July 4, 1933. B. M. SHIPLEY 1,916,535
CASH REGISTER
Filed July 9, 1925 15 Sheets-Sheet 10
Inventor
Bernis M. Shipley
By
His Attorneys

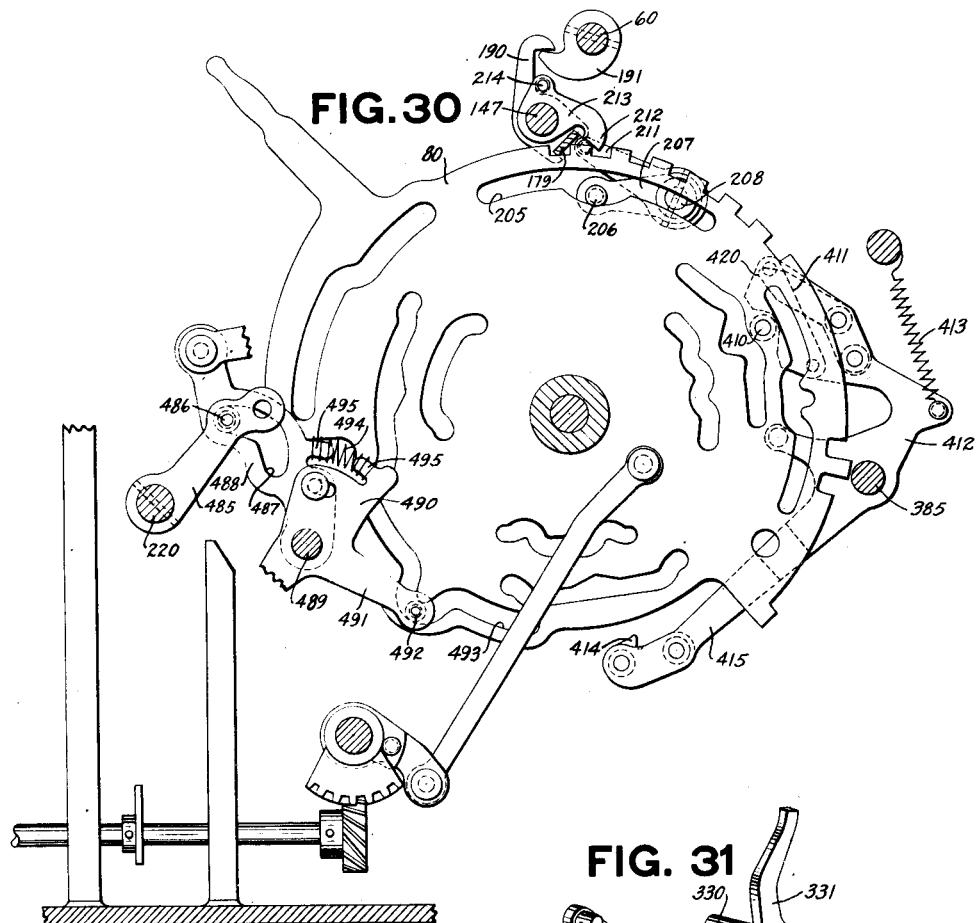
FIG. 30
FIG. 31
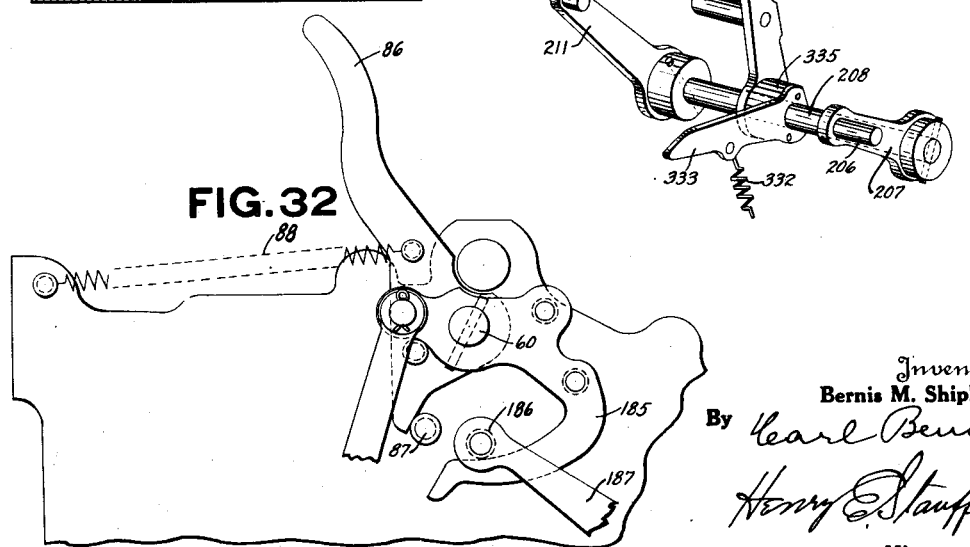
FIG. 32
Inventor
Bernis M. Shipley
By Carl Beust
Henry E Stauffer
His Attorneys

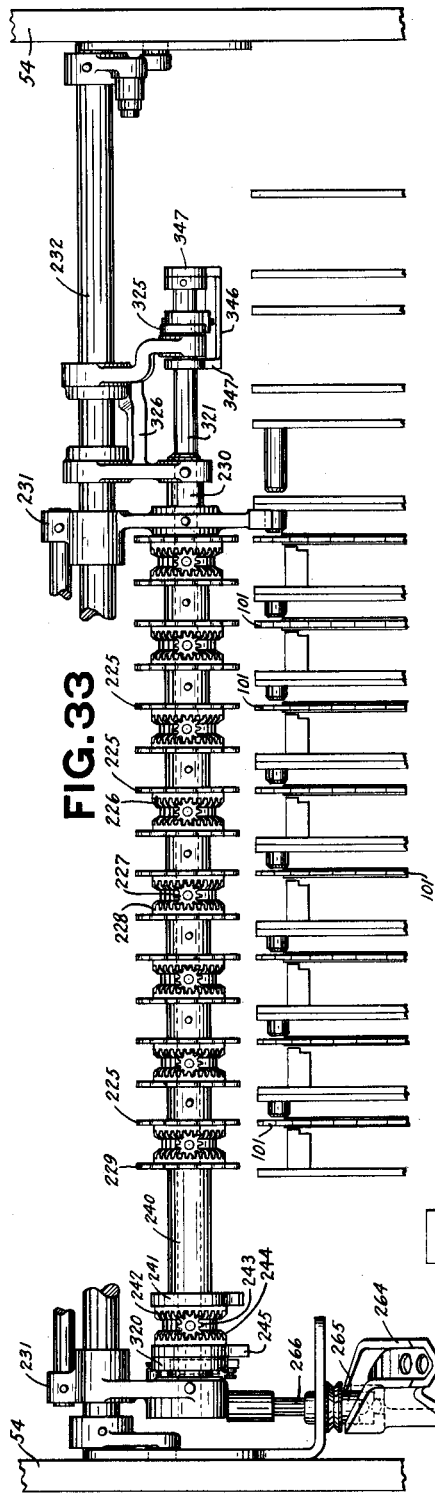

July 4, 1933.  B. M. SHIPLEY  1,916,535
CASH REGISTER
Filed July 9, 1925  15 Sheets-Sheet 13

FIG. 36

| | DATE | PUBLICATION | AMOUNT | ACCT NO | BUNDLE | DATE ENTRY | DATE SETTL | TRANS. |
|---|---|---|---|---|---|---|---|---|
| 1 | APR-5-24 | 230 | 6 90 | 54321 | 35 | 4-2 | 6 18 | C.E. |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | | | | | | | | |
| 9 | | | | | | | | |
| 10 | | | | | | | | |
| 11 | | | | | | | | |
| 12 | | | | | | | | |
| 13 | | | | | | | | |
| 14 | | | | | | | | |
| 15 | | | | | | | | |
| 16 | | | | | | | | |
| 17 | | | | | | | | |
| 18 | | | | | | | | |
| 19 | | | | | | | | |
| 20 | | | | | | | | |
| 21 | | | | | | | | |
| 22 | | | | | | | | |
| 23 | | | | | | | | |
| 24 | | | | | | | | |
| 25 | | | | | | | | |
| 26 | | | | | | | | |

NAME Smith, John
ADDRESS Brown St.
CITY Chicago, Ill.

348

1st  2nd  3rd  4th

Inventor
Bernis M. Shipley
By Earl Beust
Henry Stauffer
His Attorneys

July 4, 1933.   B. M. SHIPLEY   1,916,535
CASH REGISTER
Filed July 9, 1925   15 Sheets-Sheet 14

FIG. 37

FROM THE DOE PUBLISHING CO.
PHILADELPHIA PA.
MAGAZINE RATES   ALL CHARGES
PREPAID TO DESTINATION

To Mr. John Smith,
    Brown St.,
    Chicago, Ill.

| ISSUE | TOTAL SHIPMENT | No OF LABELS | COPIES ON THIS LABEL |
|---|---|---|---|
| APR 5-24 | 230 | | 35 |

Mr. John Smith,
Brown, St.,
Chicago, Ill.

| ISSUE | TOTAL SHIPMENT | No OF LABELS | COPIES ON THIS LABEL |
|---|---|---|---|
| APR 5-24 | | | 35 |

Mr. John Smith,
Brown St.,
Chicago, Ill.

| ISSUE | TOTAL SHIPMENT | No OF LABELS | COPIES ON THIS LABEL |
|---|---|---|---|
| APR 5-24 | 230 | 7 | 20 |

| 230 | 690 | 54321 | 35 | 4-2 6-18 |
| | | | 35 | |
| | | | 35 | |
| | | | 35 | |
| | | | 35 | |
| | | | 35 | |
| | | 35 | | |
| 35 | | | 20 | Z |
| 230 | 7 | | | PS PL |

1st  2nd  3rd  4th

Inventor
Bernis M. Shipley
By  Carl Benst
    Henry E. Stauffer
His Attorneys.

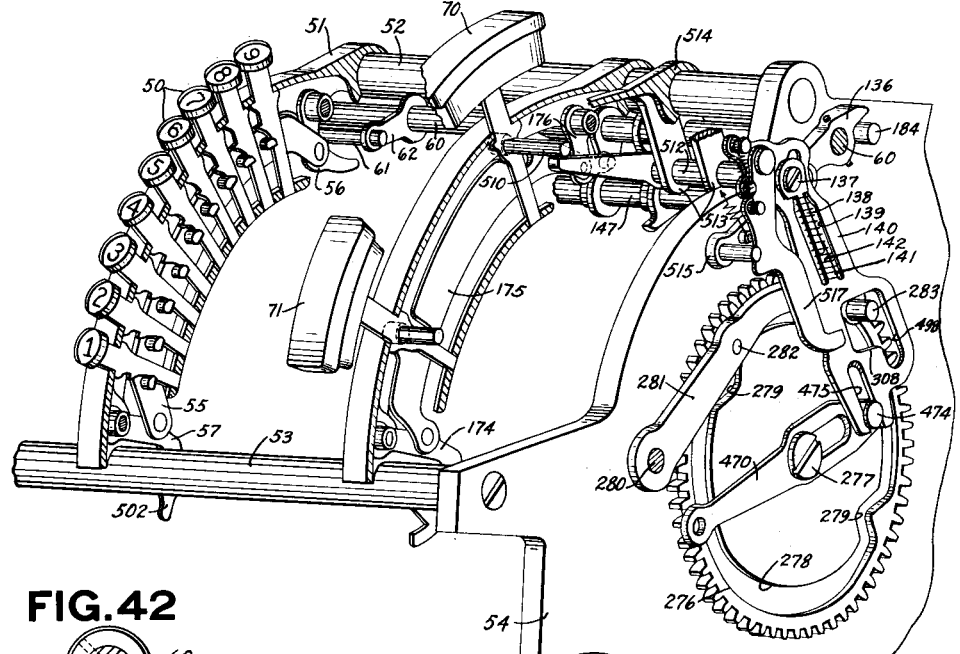

Patented July 4, 1933

1,916,535

UNITED STATES PATENT OFFICE

BERNIS M. SHIPLEY, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed July 9, 1925. Serial No. 42,458.

This invention relates to cash registers and the like, and has more particular relation to the type of machine shown and described in Letters Patent to Frederick L. Fuller, No. 1,242,170, issued on October 9, 1917, and No. 1,394,256, issued on October 18, 1921.

One object of this invention is to provide a machine for printing data on shipping labels, and for use in that class of business where an entire order cannot be shipped or mailed in one package or bundle.

Another object is to provide automatic means to lock the machine after the required number of labels have been printed upon.

Another object is to provide novel mechanism for controlling the effectivity of the machine release keys by a totalizer.

Another object is to provide a novel mechanism for controlling the release of amount keys by the machine release keys.

With these and incidental objects in view, the invention consists of certain novel features of construction and combinations of parts, the essential elements of which are set forth in appended claims and a preferred form or embodiment of which is hereinafter described with reference to the drawings which accompany and form part of this specification.

Of said drawings:

Fig. 7 is an enlarged rear view showing the machine release mechanism.

Fig. 8 is a detail view taken on the line 8—8 of Fig. 7, looking in the direction of the arrows.

Fig. 9 is a detail view taken on line 9—9 of Fig. 7, looking in the direction of the arrows.

Fig. 10 is a detail view taken on line 10—10 of Fig. 7, looking in the direction of the arrows.

Fig. 11 is a rear view of a part of the mechanism for controlling the amount key releasing mechanism.

Fig. 14 is a view of the first control bank, looking toward the left-hand end of the machine.

Fig. 15 is a detail view showing the zero stop pawl of the first control bank and a part of the mechanism for controlling it by the total lever.

Fig. 16 is a rear elevation of the inter-locking mechanism between the control keys.

Fig. 17 is an enlarged detail view of the mechanism for controlling the effectivity of the keys in the first control bank by the totalizer.

Fig. 18 is a detail view of a part of the mechanism shown in Fig. 17 (for controlling the effectivity of the keys in the first control bank.

Fig. 19 is an enlarged detail view showing a part of the mechanism associated with the keys in the first control bank for controlling the amount key releasing mechanism.

Fig. 26 is a detail view of the special counter turn-to-zero mechanism.

Fig. 27 is a detail view showing the mechanism for actuating the "spoiled label" special counter.

Fig. 28 is a detail view showing one of the special counter wheels.

Fig. 29 is a detail view showing a part of the mechanism for selecting a column for printing, by the total lever to be printed in.

Fig. 30 is a detail view of the total lever and some of its associated mechanism.

Fig. 31 is a detail perspective view showing a part of the machine release and interlocking mechanisms.

Fig. 32 is a detail view of the mechanism for manually releasing the depressed keys.

Fig. 33 is a front elevation showing the adding and subtracting totalizer and some of its associated mechanism.

Fig. 34 is a detail view showing the mechanism for ringing the bell when the totalizer is overdrawn.

Fig. 35 is a detail plan view of a part of the mechanism shown in Fig. 33.

Fig. 36 is a facsimile of the ledger card, showing the printed records made thereon.

Fig. 37 is a facsimile of a shipping label showing the data printed on the first label of an order.

Fig. 38 is a facsimile of a portion of a shipping label showing the data printed on succeeding labels of an order.

Fig. 39 is a facsimile of a fragment of a shipping label showing the data printed on the last label of an order.

Fig. 40 is a facsimile of a fragment of the audit strip showing the data printed for one order.

Fig. 41 is a perspective view showing a modified form of mechanism for controlling the releasing mechanism for the amount keys.

Fig. 42 is a detail view of a modified form of machine release mechanism.

Fig. 43 is a detail view of a modified form of machine releasing mechanism.

Fig. 44 is a detail view of a part of the mechanism shown in Fig. 41.

General Description

Figure 1:
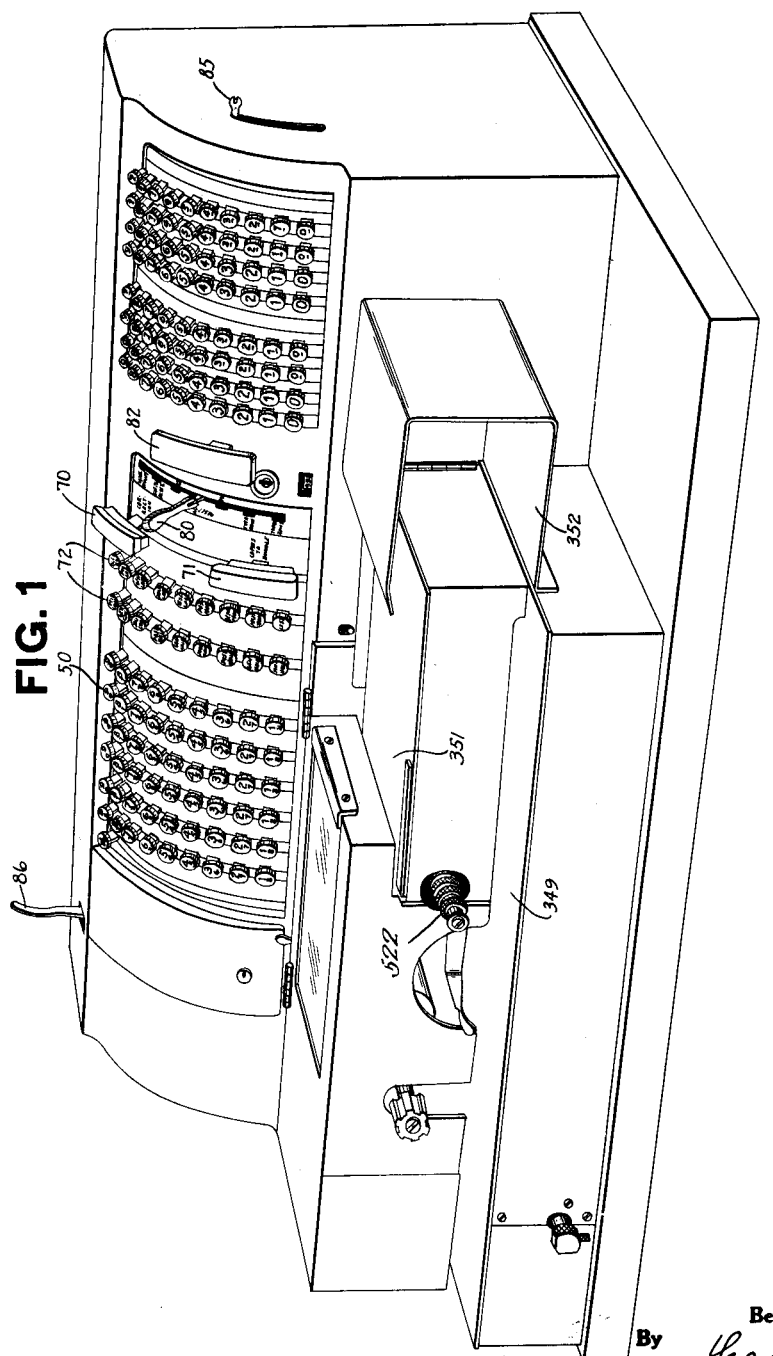
Fig. 1 is a perspective view of the machine to which the invention is applied.

It is believed that the invention herein disclosed will be better understood when shown and described in connection with a particular line of business. The invention is herein shown applied to a machine adapted to be used in large publishing houses and other businesses of analagous nature. In preparing orders for shipment, it is usually necessary to wrap the publications in more than one bundle, because of postal regulations limiting the weight which may be mailed in one bundle.

For the purposes of illustration only, an example has been assumed in which two hundred and thirty publications were ordered. The weight per publication limits the number which may be wrapped in one bundle to thirty-five. With this example in mind, a general description of the machine will be given. Shipping labels, which are to be attached to the bundles, are inserted into the machine, and data printed thereon, after which the labels are ejected from the machine into a receptacle.

The printing mechanism in this machine is of the usual type used in machines of this class, in which two printing hammers are provided for printing data on various records. A lower table is provided for printing on a ledger card and an upper table for printing on a shipping label. The upper hammer is given two operations, the first for printing on the inserted label, and the second for printing on an audit sheet. The label is ejected from the machine before the second operation of the printing hammer. The method of operating the upper printing hammer and ejecting means is disclosed in Letters Patent of the United States, No. 1,747,397, issued to applicant on February 18, 1930.

The machine herein described is provided with an amount keyboard for entering amounts into totalizers and with control keys for selecting totalizers. There are two release bars, one of which will be hereinafter known as the "correction" bar, and the other to be hereinafter known as the "copies to bundle" bar. It is also provided with an adding and substracting totalizer. The total number of copies to an order is set up on the keyboard and the number of copies ordered is entered in the adding and subtracting totalizer by depressing the main motor bar 82 which releases the machine for operation. The "correction" bar cannot be depressed unless the adding and subtracting totalizer has been overdrawn. The "copies to bundle" bar is effective only when an amount has been entered into the adding and subtracting totalizer or when the adding and subtracting totalizer is standing at zero. Both are automatically controlled by the totalizer. After an amount has been entered into the totalizer it is desired to subtract therefrom in uniform amounts according to the number of copies to each bundle. In the example assumed, the amount entered into the totalizer is two hundred and thirty (230). The uniform amount to be subtracted is thirty-five (35). The number thirty-five is therefore set up on the amount keyboard and the machine released for operation by depressing the "copies to bundle" bar. This bar selects the subtracting side of the totalizer and thirty-five is subtracted therefrom.

A mechanism is provided to prevent releasing of the amount keys during subtracting operations. Therefore, insofar as the keyboard is concerned all that is necessary for the operator to do is to press the "copies to bundle" bar successively until the totalizer is overdrawn. When the totalizer is overdrawn the "copies to bundle" bar is rendered ineffective by mechanism under control of the totalizer. Before the machine can again be operated it is necessary to add the last amount which was subtracted back into the totalizer.

The mechanism for rendering the "copies to bundle" bar ineffective, simultaneously renders the "correction" bar operative. Therefore the machine can be released by depressing the "correction" bar which selects the adding side of the totalizer and the last amount subtracted is again added into the totalizer. The mechanism for releasing the amount keys is effective when the machine is operated by depressing the "correction" bar. Therefore at the end of this operation the amount keys are released.

The usual resetting mechanism is provided and therefore the amount which now remains on the totalizer can be printed and the totalizer reset to zero. The resetting of the totalizer to zero prints the number of copies in the last bundle on the last shipping tag.

Operating means

The machine may be operated by a suitable motor, by hand by means of a crank, or any other suitable means known in the art. In the present application neither of these means hes been disclosed as they are not directly involved in the present invention.

KEYBOARD

Amount keys

Figure 2:
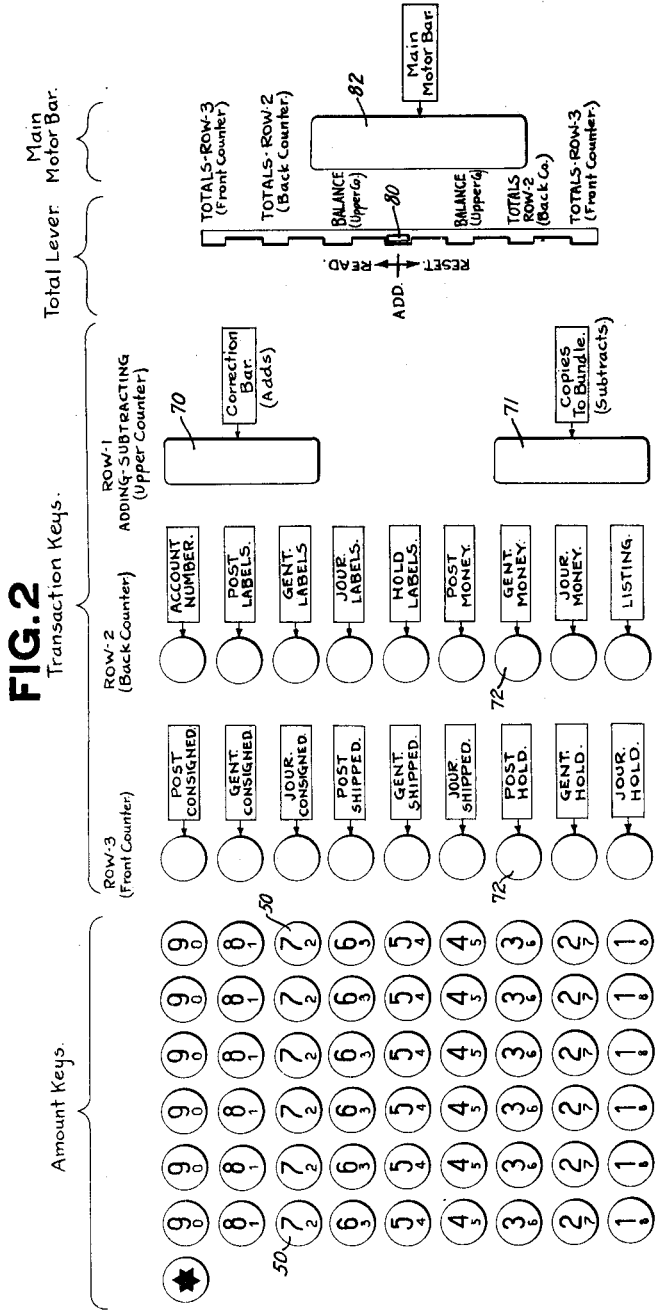
Fig. 2 is a diagrammatic view showing the keyboard of the machine.
Figure 3:
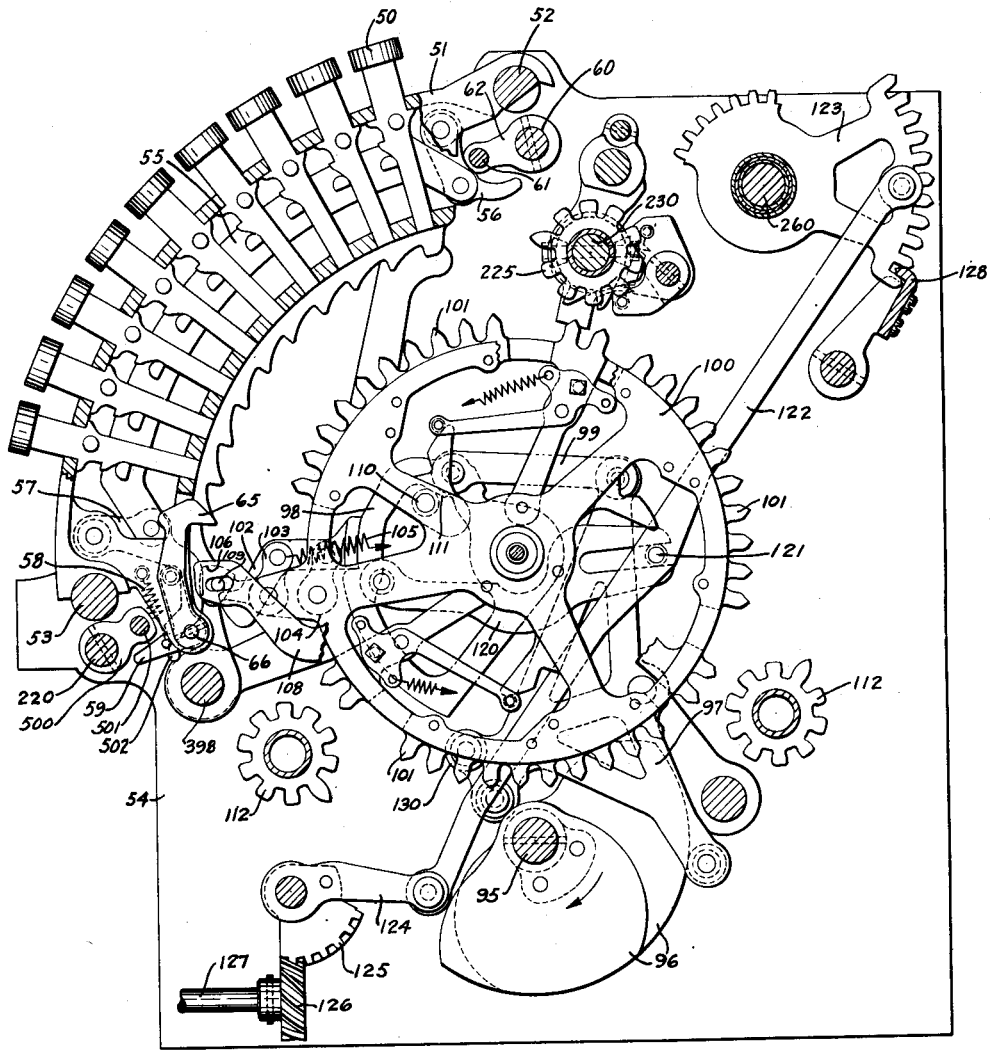
Fig. 3 is a cross section of the machine taken just to the right of an amount bank, looking toward the left end of the machine.

In the present machine there are six banks of amount keys 50, shown in Figs. 1, 2 and 3. These banks of keys are identical with those shown and described in the above mentioned patents, and therefore only a very brief description of them will be given herein. The amount keys of each bank are carried in frames 51 supported on rods 52 and 53 carried in side frames 54 of the machine. Each key has a shoulder adapted to engage a stud on a detent 55 carried by arms 56 and 57. The keys are held in their outward position by the usual key springs not shown. The detent 55 is held in its normal position by a spring 58 stretched between an arm 59 and a stud mounted in the frame 51. The arm 59 carries a stud which engages the arm 57. When a key 50 is depressed, the detent 55 is moved downwardly until the shoulder on the key passes the stud on the detent, whereupon the spring 58 moves the detent upwardly a slight distance and thereby holds the key in a depressed position. At the end of certain operations of the machine a shaft 60 is given a counterclockwise movement which moves the rod 61 carried by a plurality of arms 62, into contact with the arms 56 of all amount banks and rocks the arms far enough to disengage the studs on the detents 55 from the shoulders on the depressed keys to release them. The mechanism for rocking the shaft 60 will be hereinafter fully described.

Each bank of keys 50 is provided with a zero stop pawl 65, the function of which will be described when considering the differential mechanism. When one of the amount keys is depressed, as above described, the zero stop pawl 65 is rocked to its ineffective position in the following manner. Each of the zero stop pawls 65 is secured to a short shaft 66, upon which is secured the above mentioned arm 59. Therefore, when a key 50 is depressed, the arm 57 rocks the arm 59 in counter-clockwise direction and thereby rocks the zero stop pawl in counter-clockwise direction. The zero stop pawl remains in this position as long as the key is held depressed.

Complementary keyboard

By referring to Figs. 1 and 2, it will be seen that the amount keys have small numerals thereon, in addition to the numeral designating the value of the key. This numeral is the complement of the value number on the key. This keyboard is provided so that if too great an amount is entered into any of the various totalizers by mistake, the error can be corrected by adding the complement of the excess amount into the totalizer. This method is well known in the art and is shown in the patent issued to D. E. Felt, No. 465,255, issued on Dec. 15, 1891, and no further description is thought necessary herein.

Control keys

The control banks will be referred to in the present application as first, second and third, beginning at the left of the total lever and proceeding towards the left. The first control bank has only two keys or bars 70 and 71 (Figs. 1 and 2). The second and third control banks each have nine keys 72 (Figs. 2 and 14) which are carried in frames 51 similar to those for the amount keys. The keys 72 control the selection of totalizers into which the various amounts are accumulated. Each of the control banks is provided with a zero stop pawl 65 which is rocked into its ineffective position when one of its associated keys 72 or bars 70 or 71 is depressed. The control keys are held in their depressed positions by a detent 75 (Fig. 17) in a manner well known in the art. The only detent shown is the one used in connection with the first control bank. Each detent is carried by an arm 76 at its upper end and an arm 77 at its lower end, each carried by studs in the frame 51. The detents for the second and third banks are identical with that for the first bank, and no further disclosure is thought necessary.

Total lever

Like all machines of this type, the present machine is provided with a total lever 80 (Fig. 30). This lever is adapted to control the various totalizer lines during total taking operations, as well as for other functions which need not be gone into at present. It is thought to be sufficient here to say that the total lever selects the totalizer line which is to be rocked to move a selected totalizer thereon into engagement with the actuators during total taking operations.

Motor bar

The machine as disclosed is usually electrically operated, and in order to facilitate rapid operation of the machine, a large motor bar 82 (Figs. 1, 2, 5 and 6) is provided, which can be easily struck to release the machine. The manner in which this release by the motor bar is accomplished will be hereinafter described.

Manual key release

The operator may at times depress keys by mistake, and, to permit the release of such keys, the usual manual release lever 85 (Fig. 1) is provided. This lever releases all of the keys which may be depressed on the keyboard, including keys to the right of the total lever 80. There are times when the operator would like to release the keys which are depressed in the amount keyboard without disturbing the keys to the right of the total lever 80. In order to accomplish this, the release shaft 60 is divided into two parts, one of which can be operated by a special release lever 86 (Figs. 1 and 32). This lever releases the amount and control keys only, and will now be described. The lever 86 projects through a slot in the cabinet, as shown in Fig. 1, and is secured to the release shaft 60 (Fig. 32). It is held in engagement with a stud 87 by a spring 88. If the operator wishes to release the depressed amount keys 50 and control keys 72, he rocks the lever 86 and shaft 60 clockwise, as viewed in Fig. 32, which rocks the shaft 60 in counter-clockwise direction as viewed in Fig. 3. This movement of the shaft 60 moves the rod 61 into contact with the arm 56 and thereby moves the studs on the detent 55 from the shoulders on the depressed keys to release the keys.

DIFFERENTIAL MECHANISM

Amount bank differential

The means for entering amounts into the selected totalizers is the well known differential mechanism which is shown and described in the above mentioned Fuller patents. All of the differential mechanisms are identical and therefore only one will be described herein.

Secured to a main drive shaft 95 (Fig. 3) is a pair of cams 96 which rock a Y-shaped lever 97. The lever 97 is connected to a driving segment 98 by means of a link 99. Each bank is provided with a differentially movable actuator 100 which carries three racks 101, one for each line of totalizers. The actuator 100 is normally connected to the driving segment 98 by means of a latch 102 carried by a bell crank 103 and a link 104, said bell crank 103 and link 104 being pivoted to the actuator 100. When the cams 96 are rotated they rock the segment 98 first clockwise, and then counter-clockwise to an invariable extent. The latch 102 is held in engagement with a shoulder on the driving segment 98 by means of a spring 105 until the end of an arm 108, only a portion of which is shown, engages the zero stop pawl 65; or the end 106 of the bell crank 103 engages the end of a depressed key, whereupon the latch is disengaged from the shoulder on the segment 98. The arm 108 disengages the latch 102 from the segment 98 by means of a slot cut therein through which a stud 109 mounted on the bell crank 103 projects. This disengagement causes the actuator 100 to be positioned according to the amount key depressed. When the shoulder on the segment 98 is positioned beneath the latch 102 as the segment 98 returns toward its normal position, the latch 102 is again drawn back against the shoulder by the spring 105. The actuator 100 is carried back to its normal position by means of a surface 111 of the segment 98 which engages a stud 110 on the actuator 100 during the return movement of the segment 98. During the return movement of the differential actuator 100, the selected classification totalizer 112, and either the wheels 225 or 229 of the adding and subtracting totalizer are held in engagement with the racks 101 of said actuator and an amount is accumulated thereon commensurate with the value of the keys depressed.

Transfer mechanism

Each differential mechanism is provided with a means for carrying "one" from the lower to the higher denomination wheel when the totalizer wheel passes from nine to zero. This mechanism is shown and described in

Control bank differential

The differential mechanism of each of the control banks is substantially like those just described for the amount banks. However, these differentials are used for the purpose of selecting totalizers, but not for adding into the totalizers. For this reason, these differential mechanisms do not have the actuating racks 101. The parts which are the same as those for the amount bank differentials will be given the same reference numerals.

Each control bank differential is provided with a differentially movable arm 115 (Fig. 14) which is connected to the segment 98 by a latch 102. The segment 98 is connected to a Y-shaped lever 97 by means of a link 99 and receives an invariable clockwise and counter-clockwise movement during each operation of the machine. The arm 115 is moved with the segment 98 until the end 106 of the bell crank 103 contacts the end of a depressed key, or the end 377 of an arm 376, to be later described, contacts the zero stop pawl 65, whereupon the latch 102 is disengaged from the segment 98. From this it can be seen that the arm 115 is differentially positioned, according to the key depressed. The arm 115 is restored to its normal position by surface 111 of the segment 98, which engages the stud 110 on the arm 115 when the segment 98 returns to its normal position.

Beam mechanism

Each of the differentially movable actuators 100 and arms 115 has pivoted thereto a beam 120 (Figs. 3 and 14). The beam 120 is bifurcated to engage a stud 121 mounted on a link 122 carried at its upper end by an arm 123 and at its lower end by an arm 124. The arm 124 is secured to a spiral segment 125 meshing with a spiral pinion 126 secured to a shaft 127. The shaft 127 is operatively connected to mechanism for positioning a type carrier.

The upper arm 123 is provided with notches into which an aliner 128 is moved to hold the link 122, and arms 123 and 124, together with their connecting members in the adjusted position. The mechanism for operating this aliner is old in the art and therefore no description herein is thought necessary. It is sufficient to state herein that at the time the beam 120 is being positioned, the aliner is disengaged from the arm 123, and just before the printing takes place, the aliner is engaged with the arm 123.

The means for positioning the beam 120 associated with the control bank will now be described. Carried on the before mentioned lever 97 (Fig. 14) is a roller 130. The forward end of the beam is positioned differentially when the differentially movable arm is positioned under control of the depressed keys, as above described. When the arm 97 is rocked the roller 130 contacts the under side of the beam 120 and rocks the beam about its pivot on the differentially movable arm 115 until the center or concaved portion of the beam contacts the collar on the differential arm. This action of the beam 120 moves the link 122 into a position corresponding with the depressed key. If the center or concaved portion is in contact with the collar on the differential arm 115 when said arm is rocked clockwise, the beam 120 is rotated about the axis of the differential arm 115 and the link 122 is thus directly adjusted by the arm 115. The latter operation of the beam 120 takes place when the amount being entered is greater than the previous amount entered, while the former operation of the beam takes place when the amount being entered is less than the previous amount entered. The beam 120 associated with each of the amount banks operates in the same manner as the beam 120 just described.

MACHINE RELEASE MECHANISM

Main motor bar

The machine may be released by either the main motor bar 82 or by one of the bars 70 or 71 in the first control bank. The method of releasing the machine from the main motor bar will be first described.

Secured to the release shaft 60 (Figs. 6, 7 and 13) is an arm 135. The shaft 60 also has secured thereon an arm 136 (Fig. 5) which carries a stud 137 upon which two spring pilot arms 138 are mounted. The stud 137 projects through a slot 139 formed in a link 140 having a projection 141. Surrounding the pilots of the pilot arms 138 and the projection 141 is a spring 142 which normally bears against the clips 138 and a shoulder in the link 140, thereby tending to rock the release shaft 60 in a clockwise direction. This clockwise movement of the shaft 60 is prevented by two pawls 145 and 148 (Fig. 8), which lie in the path of a flattened stud 146 mounted on the before mentioned arm 135. The pawls 145 and 148 are loosely mounted on a shaft 147. Before the release shaft 60 can be rotated by the spring 142, the two pawls 145 and 148 must be removed from the path of the stud 146.

Mounted on the pawl 148 (Figs. 7 and 8), is a stud 150 engaged by a bifurcated portion of an arm 151 loosely mounted on the release shaft 60. The arm 151 is connected with an arm 152 (Figs. 6 and 7) by a yoke 153. The arm 152 carries a stud 154 which normally contacts the under side of a projection 155 of an arm 156 connected with an arm 157 by means of a yoke 158. The arm 157 is bifurcated to surround a stud 159 mounted in a lever 160, pivoted on a stud 161, and having a bifurcated portion engaging a stud 162 (see also Fig. 5). The stud 162 is carried by a slide 163 mounted on two studs 164 and 165 carried by the right side frame 54 of the machine. Mounted on the slide 163 are two studs 166 and 167. The motor bar 82 is forked to surround the studs 166 and 167 so as to be removable from the machine. The stud 166 is of a diameter equal to the normal width of the slot and the stud 167 is of slightly greater diameter. The forks are provided with notches 168 which are adapted to engage the stud 167 after the bar has been forced thereon. The purpose of this construction is to provide a simple way of removing the motor bar from the machine if desired.

From the above description it can be seen that when the motor bar 82 is struck by the operator, the pawl 148 is lifted from in front of the stud 146. This permits slight movement of the release shaft 60, but not sufficient to release the machine, because it is immediately arrested by the pawl 145, unless a control key has been previously depressed. The mechanism for withdrawing the pawl 145 from the path of the stud 146 will now be described.

Figure 21:
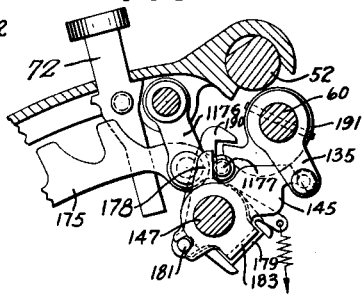
Fig. 21 is a detail view showing the interlock between the control keys and the release bars.

The first control bank is provided with a detent 175 (Figs. 7, 13 and 19), supported at its lower end by an arm 174 and at its upper end by an arm 176, similar to an arm 1176 (Fig. 21). A stud 177 (Figs. 7, 9, 13 and 21), projects from the side of the arm 176 and contacts one edge of an arm 180 connected to an arm 1781 by a yoke 179. The arm 1781 is contacted by a stud 2177 (Fig. 7) on an arm 2176 in the third control bank. The arm 2176 is similar to the arm 1176 (Fig. 21) and is operated by a detent similar to the detent 175. An arm 178 (Fig. 7) is bifurcated to embrace the yoke 179. A stud 1177 (Fig. 21) on an arm 1176 is operated by a detent, similar to the detent 175 of the first bank, and contacts one edge of the arm 178. The arms 180, 178 and 1781, together with the yoke 179 form a unitary frame, and depression of a key in any one of the control banks rocks this frame. The arm 180 carries a stud 181 which projects into a bifurcated portion of an arm 182 connected to the pawl 145 (Figs. 7 and 8) by a cross bar 183. From this it can be seen that when a control key of either the second or third bank is depressed, the pawl 145 is rocked from the path of the stud 146.

Another interlock between the control keys 72 and the main motor bar 82 is provided, which is wholly independent of the interlock 145—146. Loosely mounted on the shaft 147 is a hook arm 190 (Figs. 7, 10 and 21), which is bifurcated at one end to straddle the bar 179 above described. The upper end of the hook arm 190 is adapted to engage an arm 191 secured to the release shaft 60. When any of the control keys 72 are depressed as just described, the arms 178 are rocked counter-clockwise and the bar 179 through its engagement with the hook arm 190 disengages said hook arm 190 from the arm 191 and thereby permits the shaft 60 to be rocked to release the machine.

The release shaft 60 is rocked clockwise (Fig. 5) under the influence of the spring 142 until the arm 136 engages a stud 184 mounted on the right side frame 54 of the machine. This movement which is counter-clockwise as viewed in Fig. 32 is sufficient to rock an arm 185 from beneath a stud 186 on an arm 187 which forms part of the mechanism for releasing the motor. The mechanism for releasing the motor is old and well known in the art and therefore no further description is thought necessary.

*Machine release from first control bank*

During certain kinds of operations it is desired to release the machine by means of the "copies to bundle" bar 71 or the "correction" bar 70, which are in the first control bank, without depressing the main motor bar 82. The mechanism for accomplishing this result will now be described.

Figure 13:
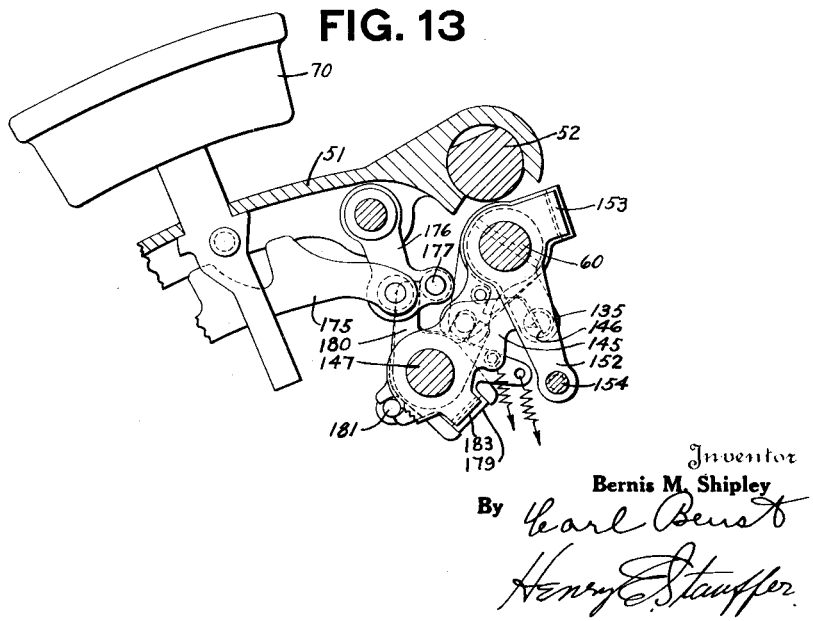
Fig. 13 is an enlarged detail view showing the mechanism for releasing the machine by the keys in the first control bank.

When either of the bars 70 or 71 is depressed, the detent 175 for this bank is moved downwardly and thereby rocks the arm 176, for the first control bank clockwise (Figs. 7, 9 and 13). This movement of the arm 176, through the engagement of the stud 177 with an arm 189 loose on the shaft 147, rocks the arm 189 in counter-clockwise direction. The arm 189 has a projection 192 resting against a stud 193 mounted in an arm 194 loosely mounted on the release shaft 60. The arm 194 is secured to an arm 195 (Fig. 8) by means of a cross bar 196. The arm 195 is normally in contact with a stud 197 mounted in the before mentioned arm 151. From this it can be seen that when one of the bars 70 or 71 is depressed, the arm 176 rocks the arm 189 in counter-clockwise direction and thereby rocks the arms 194 and 195 in clockwise direction. The arm 195, by means of the stud 197, rocks the arm 151 in clockwise direction to rock the above mentioned pawl 148 from the path of the stud 146.

It will be remembered that there are two pawls, namely, 145 and 148, in the path of the stud 146. The mechanism for moving the pawl 145 from the path of the stud 146 will now be described. The stud 177 (Figs. 7 and 13) on the arm 176 for the first control bank is long enough to engage both the arm 189 (Figs. 7 and 9) just described and the arm 180 described when considering the mechanism for releasing the machine from the main motor bar 82. When either of the bars 70 or 71 is depressed, the arm 180 is rocked counterclockwise to rock the arm 182 and the pawl 145 in counter-clockwise direction. This moves the pawl 145 from the path of the stud 146 in the same manner as above described when the bar 82 is depressed.

To release the machine it is also necessary to remove the previously described hook arm 190 from the path of the arm 191 which latter arm is fast on release shaft 60. As above stated the stud 177 rocks the arm 180 and consequently the cross bar 179 is moved therewith. Therefore, since the hook arm 190 straddles the cross bar 179 (Figs. 7 and 10) the bar 179 imparts a sufficient movement to the hook arm 190 to remove the latter from the path of the arm 191.

From this description it is apparent that when either one of the bars 70 or 71 is depressed, both the pawls 145 and 148 are rocked from the path of the stud 146, and the hook arm 190 is removed from the path of the arm 191 to permit the release shaft 60 to release the machine.

It is sometimes desired to release the machine during a total taking operation by use of the main motor bar 82 without pressing a control key. To permit this, it is necessary to disengage the hook arm 190 from the arm 191 and to rock the pawl 145 from the path of the flattened stud 146 by the total lever 80. The total lever 80 (Figs. 7 and 30) has a cam slot 205 into which projects a stud 206 secured to an arm 207 fast on a shaft 208. The shaft 208 is carried by differential hangers 209 and 210. Also fast on the shaft 208 is an arm 211 carrying a stud in contact with a projection 212 on an arm 213 loosely mounted on the above described shaft 147. The arm 213 carries a stud 214 which contacts the hook arm 190.

From the above description it can be seen that when the finger piece of the total lever 80 (Fig. 39) is moved either up or down into one of its total and sub-total control positions, the arm 211 is rocked in clockwise direction. The arm 211 rocks the arm 213 and disengages the hook arm 190 from the arm 191. Since the hook arm 190 straddles bar 179 (Fig. 30), the movement of said arm 190 by the total lever 80, through the bar 179, rocks the arm 182 (Fig. 9) and the bar 183 counterclockwise to rock the pawl 145 (Fig. 8) from the path of the stud 146. The machine can then be released by depressing the main motor bar 82 (Fig. 6), which rocks the arm 148 from the path of the stud 146, as above described.

*Summary of the machine release mechanism*

A brief summary of the operation of the machine release mechanism will now be given. Depression of a control key 72 for adding operations, rocks the hook arm 190 out of the path of the arm 191; and the pawl 145 out of the path of stud 146. Depression of the main motor bar 82 rocks the pawl 148 out of the path of the stud 146. Thus to release the machine for adding operations by the main motor bar 82 a control key 72 must first be depressed.

During certain total taking operations the machine is released by depression of the motor bar 82 only. Shifting of the total lever 80 to a total or sub-total taking position moves the hook arm 190 out of the path of the arm 191; and the pawl 145 out of the path of stud 146. Depression of the main motor bar 82 with the total lever in the shifted position, releases the machine by rocking the pawl 148 out of the path of stud 146.

Depression of either motor bar 70 or 71 rocks both pawls 145 and 148 out of the path of 146 and also rocks the hook arm 190 out of the path of 191, thus freeing the release shaft 60 so that it can be rocked to release the machine for operation.

*Control bank interlock*

In the present machine it is desired to prevent the operator from depressing more than one control key 72 for an operation of the machine. Slidably mounted on a shaft 220 (Figs. 14 and 16), carried by the side frames 54 of the machine, are two slides 221 shaped at their upper sides to partially surround the above mentioned rod 53. The arms 174 have downwardly projecting tails 222 (see also Fig. 19) which are adapted to wedge in between the slides 221. The slides 221 are so spaced on the shaft 220 that no more than one of the projections 222 can be rocked in between them at one time, as shown in Fig. 16. From this it is apparent that only one of the control keys 72 can be depressed for an operation of the machine.

TOTALIZERS

*Classification totalizers*

The machine is provided with two lines of classification totalizers 112 (Fig. 3) and one adding and subtracting totalizer 225—229 (Figs. 3 and 33). The classification totalizers 112 are of the usual and well known type commonly used in this type of machine and a full description may be had by referring to the above mentioned Fuller patents. There are nine totalizers 112 mounted on each of the two lower totalizer lines, one for each of the keys 72 in the second and third control banks. The totalizer lines are shifted to select a totalizer under control of the control key 72 which has been depressed. These two totalizer lines form no part of the present invention except insofar as they cooperate therewith to obtain the ultimate result desired to be accomplished by the machine, and therefore no further description is thought necessary herein.

Adding and subtracting totalizer

The upper totalizer (Figs. 3 and 33) is of the well known adding and subtracting type where two wheels are used, one of which is for adding the amounts into the totalizer, and the other for subtracting therefrom. Referring to Figs. 3 and 33, the totalizer elements 225 are the subtracting wheels. Secured to the side of each of the wheels 225 is a beveled gear 226 (Figs. 33 and 35) meshing with small beveled pinions 227 which are in mesh with beveled gears 228 secured to the side of the adding totalizer wheels 229. There is one set of wheels for each amount bank in the machine, all of which are mounted on the shaft 230 carried by arms 231 (Fig. 33). The arms 231 are adapted to be shifted laterally on a shaft 232 by mechanism to be hereinafter described.

When the totalizer wheels 225 are in engagement with the actuator racks 101, said wheels are driven in clockwise direction (Fig. 3) thus rotating the wheels 229 clockwise. When the totalizer frame is shifted to the right (Fig. 33) during adding operations, the wheels 229 are engaged with the actuator racks 101 and by means of gears 226, 227 and 229 drive the wheels 225 in the opposite direction. This mechanism is old and well known in the art and it is therefore thought that no further description is necessary.

Bell ringing mechanism

A mechanism is provided to notify the operator when the adding and subtracting totalizer is being overdrawn, that is, when a greater amount is subtracted therefrom than was entered therein; and when the totalizer passes from a negative amount to a positive amount, that is, after the totalizer has been overdrawn and an amount has again been entered into the totalizer which is sufficient to carry the adding wheels 229 from nine to zero. This mechanism will now be described.

Secured to the highest order wheel 229 by a sleeve 240 is a cam 241 (Figs. 33, 34 and 35). Secured to the side of the cam 241 is a bevel gear 242 meshing with a pair of bevel pinions 243 which mesh with a bevel gear 244 secured to the side of a cam 245. Secured to the back frame 246 of the machine is a bracket 247 upon which is pivotally mounted a lever 248, one end of which is adapted to be engaged by the cams 241 and 245. The cam 245 is shifted into the path of the lever 248 during adding operations and the cam 241 is shifted into the path of the lever 248 during subtracting operations. The lever 248 is normally held against a stud 249 carried by the bracket 247, by means of a spring 250. Also mounted on the back frame 246 is a bell 251. The lever 248 has a hammer 252 which is adapted to strike the bell 251. The cam 241 is so located on the sleeve 240 in relation to the wheels 229 that when the totalizer is being overdrawn and the wheels 229 of the highest order is passing from zero to nine, it will rock the lever 248 clockwise about its pivot. When the cam 241 passes the lever 248 the spring 250 rapidly rotates the lever 248 counter-clockwise and thereby causes the hammer 252 to strike the bell 251 which notifies the operator that the totalizer has been overdrawn.

When the totalizer is shifted to its adding position, the cam 245 is in the path of the lever 248. When an amount is added into the totalizer after it has been overdrawn, and as the totalizer wheels 229 pass from nine to zero, the cam 245 operates the hammer 252 to cause it to strike the bell 251 to again notify the operator that the totalizer is no longer overdrawn.

Adding and subtracting totalizer shifting mechanism

The adding and subtracting totalizer is shifted under control of the first control bank by mechanism which is old and well known, and therefore only a brief description of this mechanism will be given herein.

Figure 22:
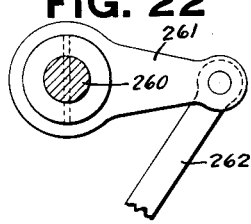
Fig. 22 is a detail view showing a part of the adding and subtracting totalizer shifting mechanism.
Figure 23:
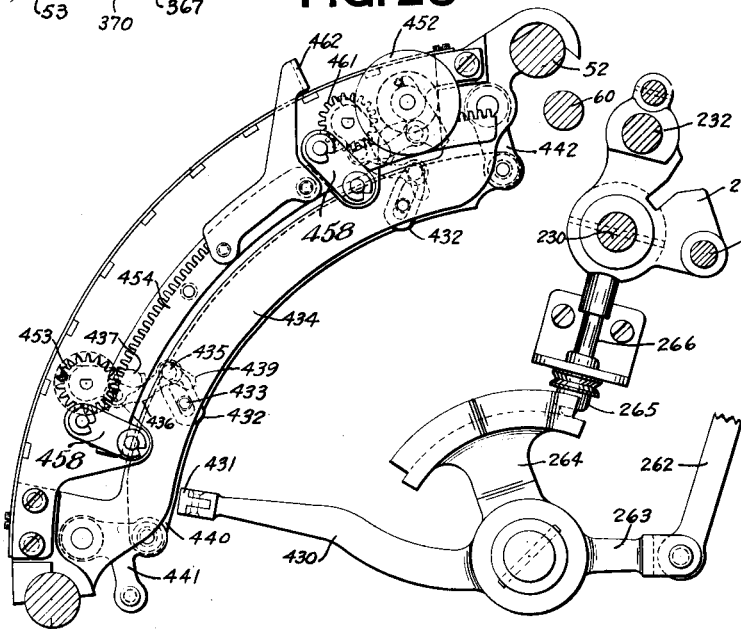
Fig. 23 is a right-hand elevation of the special counter mechanism, and of the adding and subtracting totalizer shifting cam.

The "copies to bundle" bar 71 is adapted to select the subtracting side and the "correction" bar 70 the adding side of the totalizer. The arm 123 (Fig. 14) for the first control bank is pinned to a shaft 260 carried by the side frames 54 of the machine. It will be remembered that the arm 123 is differentially positioned by the link 122 and the beam 120 of the differential mechanism. Also secured to the shaft 260 is an arm 261 (Fig. 22) to which is pivoted a link 262 (Figs. 22 and 23) pivoted to an arm 263 of a shifting cam 264 (Figs. 23 and 33). The cam 264 engages a roller 265 on the end of a stud 266 mounted in one of the arms 231 of the adding and subtracting totalizer frame. The cam 264 is so shaped that when the differential mechanism is differentially positioned under the control of the "copies to bundle" bar 71, it shifts the totalizer so that the subtracting wheels 225 are in position to be engaged with the actuating racks 101, and when the totalizer is positioned under the control of the "correction" bar 70 said cam 264 shifts the totalizer so that the adding wheels 229 are in position to engage the actuating racks 101.

Totalizer engaging control

The differential mechanism for the first control bank is also used to select columns for printing data, as will be hereinafter described. During these data printing operations the adding and subtracting totalizer is shifted in the manner just described, but mechanism is provided to prevent the totalizer from engaging the actuators 101. This mechanism is old and well known in the art and no description is thought necessary, since it forms no part of the present invention. It is sufficient to state here that the adding and subtracting totalizer is engaged with the actuating racks 101 during all operations of the machine except when a key 72 is depressed in the second control bank or when any one of the eight lower keys in the third control bank is depressed.

KEY RELEASING MECHANISM

Key release mechanism during adding operations

During adding operations of the machine, it is desired to control the mechanism for releasing the amount keys so that at the end of the operation the keys release, and during subtracting operations to control the releasing mechanism so that the amount keys remain depressed to permit the subtracting operation to be repeated without again depressing the amount keys. The mechanism for releasing the amount keys at the end of an adding operation will be described first.

Figure 12:
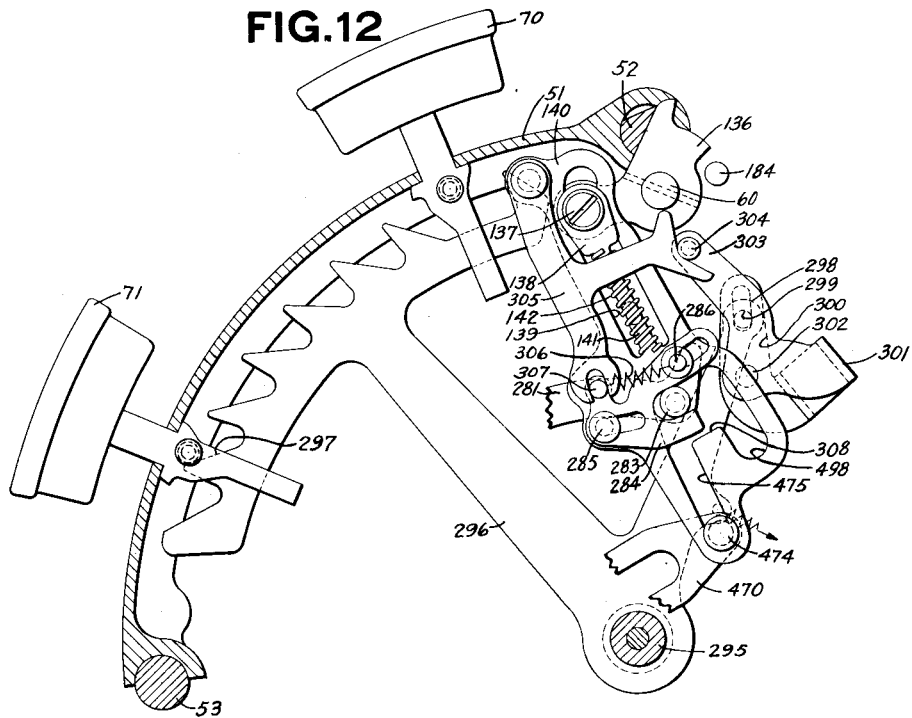
Fig. 12 is an enlarged detail view showing the mechanism for controlling the release of the amount keys by the keys in the first control bank.

Secured to the main drive shaft 95 (Fig. 5) is a gear 275 meshing with a gear 276 carried by a stud 277 mounted in the right side frame 54 of the machine. The ratio of the gears 275 and 276 is such that the gear 276 receives a one-half rotation for each rotation of the gear 275. The gear 276 has a cam race 278 cut in the side thereof having two nodes 279. Loosely mounted on a stud 280 is a lever 281 carrying a roller 282 engaging the cam race 278. The lever 281 carries a stud 283 (Figs. 5 and 12) projecting into a bifurcated portion of a slide 284 slidably mounted on two studs 285 and 286. The studs 285 and 286 are mounted on the previously described link 140. It will be remembered that when the machine is released the release shaft 60 is given a clockwise movement sufficient to carry the stud 137 on the arm 136 into the upper part of the slot 139 in the link 140. Near the end of an operation of the machine, one of the nodes 279 cams the lever 281 in clockwise direction and moves the link 140 downwardly by means of the stud 283 and the slide 284 and thereby rocking the release shaft 60 counter-clockwise. This counter-clockwise movement of the shaft 60 rocks the arms 62 (Fig. 3) in counter-clockwise direction until the rod 61 engages the arms 56 to move the studs on the detent 55 from the shoulders of the amount keys 50. This permits the keys to release.

The machine is also provided with a means for releasing the control keys 72 and the bars 70 and 71. Mounted on the shaft 60 is an arm 290 (Fig. 17) for each control bank which cooperate with the arms 76. When the shaft is rocked counter-clockwise as above described the arms 290 move the detents 75 downwardly and release the depressed key 72, whereupon said key 72 is restored to its normal position by the usual key spring (not shown). The depressed bar 70 or 71 is also released by the movement of the shaft 60, as just described, and a spring 79 restores said depressed bar to its normal position.

Key release mechanism during subtracting operations

It will be remembered that the "copies to bundle" bar 71 always selects the subtracting side of the totalizer. During operations in which this bar is used to release the machine, it is desired to render ineffective the mechanism for releasing the amount keys 50. The mechanism for accomplishing this will now be described.

Mounted on a stud 295 (Figs. 12 and 19), carried by the first control bank differential hanger, is a segmental lever 296 having an inclined edge 297 which is engaged by the stud on the "copies to bundle" bar 71. The lever 296 has an upwardly projecting arm 298 carrying a stud 299 which projects into a slot in an arm 300 (Figs. 11, 12 and 19) connected by a bar 301 to an arm 303. The arm 300 is pivoted on the shaft 208 and the arm 303 is pivoted on a stud 302 on the right side frame 54. The arm 303 carries a stud 304 (Fig. 12) which cooperates with a lever 305 pivoted on the previously mentioned link 140. The lever 305 is bifurcated at its lower end to straddle a stud 307 on the slide 284. The lever 305 is held against the stud 304 by means of a spring 306 stretched between the stud 307 and the stud 286 carried by the link 140. From the above description it can be seen that when the "copies to bundle" bar 71 is depressed, the lever 296 is rocked counter-clockwise, which, through the arms 300 and 303 and bar 301 rocks the lever 305 in counter-clockwise direction and thereby moves the slide 284 toward the left (Fig. 12) far enough to disengage the bifurcated portion of the slide from the stud 283 on the lever 281. During the operation of the machine when one of the nodes 279 rocks the lever 281 clockwise, the stud 283 engages the shoulder 308 of the link 140. It will be noticed that the lever 281 moves idly before the stud 283 engages the shoulder 308, and that the link 140 therefore receives but a slight movement. This movement is sufficient to cause the release shaft 60 to be rocked slightly past its normal position to release the control keys 71 and 72 which may be depressed, but not enough to carry the rod 61 against the arm 56 (Fig. 3) to release the depressed amount keys.

Means for crippling the release mechanism when the totalizer has been overdrawn A mechanism is provided for rendering the machine releasing mechanism ineffective for operation by means of the "copies to bundle" bar 71 and the main motor bar 82 when the totalizer has been overdrawn.

Secured to the above mentioned cam 245 is a cam 320 (Figs. 17, 18, 33 and 35). Carried by the arms 231 of the totalizer frame and a bracket 326 is a shaft 321 to which is secured an arm 322, held in engagement with the cam 320 by a spring 323 stretched between a stud on the arm 322 and a stud 324 carried by one of the frames 231. Also secured to the shaft 321 is an arm 325. The arm 325 is engaged by a stud 330 (Figs. 11 and 17) mounted in an arm 331 loosely supported on the above mentioned shaft 208. The stud 330 is normally held in engagement with the arm 325 by a spring 332 stretched between an arm 333 and a stud 334 carried by one of the differential hangers. The arm 333 is secured to the arm 331 by means of a hub 335 (Fig. 7). Secured to the release shaft 60 is an arm 336 which lies in the plane of the above mentioned arm 331.

When the totalizer is being overdrawn and the wheel 229 of the highest order moves from zero to nine, the cam 320 rocks the arm 322 in counter-clockwise direction (Fig. 17) and thereby rocks the arm 325 from beneath the stud 330, which permits the spring 332 to rock the arm 331 beneath the arm 336 on the release shaft 60. The movement of the arm 331 is limited by a stud 337 carried by a lever 338 to be hereinafter described. It is evident that so long as the arm 331 remains beneath the arm 336 it is impossible to release the machine. It is possible to depress the "copies to bundle " bar 71 and the main motor bar 82 when the arm 331 is beneath the arm 336, but they are ineffective to release the machine.

"Correction" bar

The "correction" bar 70 is provided to permit the release of the machine and to add an amount into the totalizer after the totalizer has been overdrawn, as just described. When the totalizer has been restored to a condition whereby an amount is on the positive side of the totalizer, the "copies to bundle" bar 71 and main motor bar 82 are again effective to release the machine. The "correction" bar is normally inoperative, that is, so long as an amount is on the positive side of the totalizer, or if the totalizer is standing at zero, the "correction" bar cannot be depressed. The mechanism for preventing the depression of the "correction" bar will now be discussed.

The above mentioned lever 338 (Fig. 17) is pivoted on the stud 295 and has an inclined surface 340 which is engaged by the stud on the "correction" bar 70. The lever 338 has a slot 341 into which a stud on the "copies to bundle" bar 71 moves when that bar is depressed. From this it is apparent that only the "correction" bar is effective to rock the lever 338. However, this rocking movement normally is prevented by a pawl 342 which is pivoted on the rear end of the lever 338. The pawl 342 has a forwardly extending arm 343 normally held against a stud 344 on the lever 338 by a spring 345 stretched between the pawl 342 and the stud 334. The pawl 342 lies in the path of a yoke 346 (Figs. 33 and 35) which serves to connect two arms 347 secured to the above mentioned shaft 321. With the mechanism in position as shown in Fig. 17, which is the position it assumes when the totalizer is standing at zero, it is impossible to depress the "correction" bar because the yoke 346 prevents any movement of the pawl 342 and thereby prevents any rocking movement of the lever 338.

When the totalizer is overdrawn and the cam 320 rocks the shaft 321 as above described, the yoke 346 is rocked from the path of the pawl 342 and permits movement thereof and of the lever 338. It is therefore apparent that with the totalizer in an overdrawn position it is possible to release the machine by use of the "correction" bar. When the "correction" bar 70 is depressed the lever 338 is rocked in counter-clockwise direction. The stud 337 lifts the arm 333 and rocks the arm 331 from beneath the arm 336 to permit the release shaft 60 to receive its rocking movement under the influence of the spring 142. During the operation of the machine the correction bar selects the adding side of the adding and subtracting totalizer, and, therefore, the amount represented by the depressed keys 50 is added into the totalizer and the totalizer is thus restored to a positive condition, which permits the spring 323 to rock the arm 322 clockwise and rock the yoke 346 into the path of the pawl 342 so that when the "correction" bar is released at the end of the operation, the pawl 342 is restored to the position shown in Fig. 17 to prevent depression of the correction bar 70 until the totalizer is again overdrawn.

Column Printing Mechanism

The data printed by the machine is printed in different columns. The ledger card 348 (Fig. 36) is placed in position on the table 349 (Fig. 1), according to the line to be printed upon. The labels 350 (Figs. 37, 38 and 39) are inserted on the table 351 (Fig. 1). After the labels have been printed, they are ejected into a receiver 352 by mechanism not shown. The audit sheet shown in Fig. 40 is wound around two spools and remains in the machine.

The printing mechanism, and the mechanism for controlling the operation of the various printing hammers, has not been shown or described herein. This mechanism is identical with the mechanism shown and described in the Letters Patent of the United States, No. 1,747,397, issued to applicant on February 18, 1930. Only that part of the mechanism which is under control of the various control keys and the total lever has been shown herein, in order to disclose the various modifications required to fit the selecting mechanism into the system herein described. However, the mechanism is substantially like that shown and described in the last named patent, and therefore only a brief description will be given herein. It is thought sufficient to state that the column in which the printing is to be performed is selected by means of mechanism under the control of the differentially movable arm 115 in the first control bank (Fig. 14). The position in which the latch 102 is disengaged from the driving segment 98 positions the arm 115 and thereby determines the position into which the beam 120 will move the link 122, and through its connecting mechanism, rock the shaft 127 which in turn will position mechanism (not shown) for selecting a printing hammer for the desired column printing.

As above mentioned the type wheels, hammers and mechanism directly connected thereto are not shown in this application, but Fig. 32 of the above mentioned co-pending application Serial No. 686,564, describes and illustrates the selective printing hammers, mechanism directly connected thereto for selecting the same under control of the keys in the control banks, and Fig. 42 shows a type wheel line from which the printing is effected upon an inserted card.

In said application there are only three columns of the card in which amounts are to be printed, and, therefore, there are only three groups of amount type wheels, whereas, in the present application, it is desirable to print in more than three columns on the card 348. For this reason the type line when used herein shall have more than three groups of amount type wheels and a corresponding number of selective hammers cooperating therewith.

This system of column selecting, wherein the several printing hammers are selected and released to print in the various columns desired, eliminates the necessity of shifting the record material to select the columns, as has been frequently done in the prior art.

For reasons to be later explained, certain columns on the card (Fig. 36) are designated "1st", "2nd", "3rd" and "4th". The columns of the card 348 which will be selected and printed in when the latch is broken in the various positions, have been tabulated below:

9 position—selects 1st column
0 position—selects 2nd column
7 or 8 position—selects 3rd column
2 or 5 position—selects 4th column It is thought that this is sufficient for the purpose of the present application. The position referred to in the table is the position in which the latch is disengaged from the driving segment 98, and the column refers to the column in which the printing is to be performed during the operation of the machine. The mechanisms for disengaging the latch in the various positions will be described in the order in which they have been given in the table.

*Means for breaking the latch in the "9" position*

By referring to Fig. 2, it will be seen that the third control bank row "3" contains keys representing the various publications to be shipped, and the data representing the number of publications is printed in the column headed "Publication" (Fig. 36). This column designated "1st" will be hereinafter known as the first column, the date column being disregarded when discussing the column selecting mechanism, since the date is always printed in said date column and requires no selection. It must be remembered that the differential in the first control bank selects the column to be printed in. In order to disengage the latch of the first control bank from the segment 98 in the "9" position it is necessary to rock its zero stop pawl 65 (Fig. 14) to its ineffective position. Depression of any key 72 in the third control bank rocks the zero stop pawl 65 of the first control bank to its ineffective position. Inasmuch as neither the "copies to bundle" or the "correction" bar is depressed in the first bank when the number of publications are entered, the differentially movable arm 115 of the first bank is moved until the latch 102 is disengaged from the driver 98 by contacting a fixed pin 355 carried by the first control bank hanger. The mechanism for rocking the zero stop pawl 65 to its ineffective position by the keys 72 in the third control bank will now be described.

Figure 20:
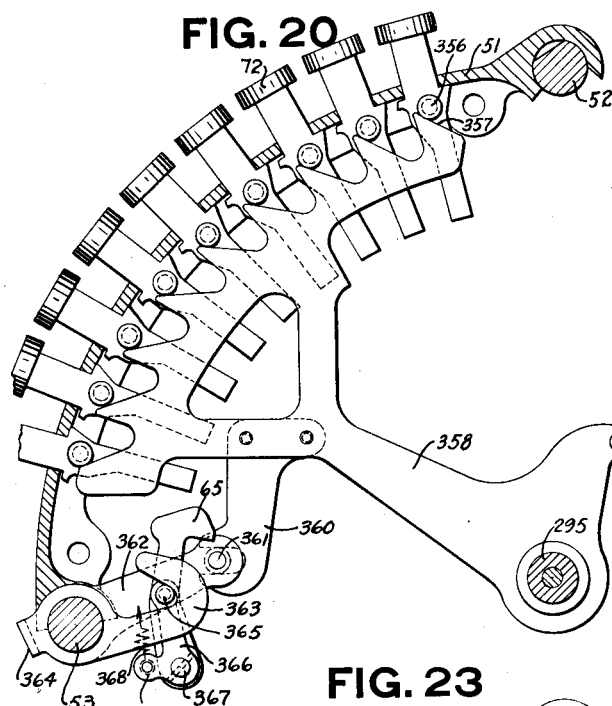
Fig. 20 is an enlarged detail view showing the keys in the third control bank and the mechanism associated therewith for controlling the zero stop pawl of the first control bank.

Each of the keys 72 (Fig. 20) in the third bank has a stud 356 against which inclined surfaces 357 of a lever 358 are held by means of a spring 359 stretched between a stud on the lever 358 and a stud on the differential hanger. The lever 358 is pivoted on the stud 295 and has a downwardly projecting arm 360 which is bifurcated to straddle a stud 361 mounted on an arm 362 pivoted on the rod 53. The arm 362 is connected to a hook 363 by a long yoke 364. The hook 363 is located in the first control bank and engages a stud 365 (Figs. 14, 15 and 20) mounted on an arm 366 secured to a shaft 367. The shaft 367 is carried by the key frame 51 of the first control bank. It has secured thereto the zero stop pawl 65 for this bank. The stud 365 is held in the hook 363 by means of a spring 368 stretched between a stud 369 mounted in the key frame 51 and a stud 370 on the arm 366.

From the above description it can be seen that when a key 72 in the third control bank is depressed, the lever 358 through the connections just described, rocks the zero stop pawl 65 of the first control bank to its ineffective position to permit the differentially movable arm 115 of the first control bank to be carried to the "9" position, which position controls the printing mechanism so that the printing is effected in the "1st" column of the card 348 (Fig. 36).

*Means for breaking the latch in the "0" position*

When the machine is operated with one of the eight lower keys 72 of the second control bank depressed, the data is printed in the second column, which is headed "Amount" in Fig. 36. This column is selected when the differential arm 115 of the first control bank is positioned in the "0" position. There is no connection between the second control bank and the zero stop pawl 65 of the first control bank, like the yoke 364 for the third and first banks, and therefore the eight lower keys of the second control bank have no control over the zero stop pawl 65 of the first control bank. When the machine is operated with one of the eight lower keys 72 depressed, the latch of the first control bank is disengaged from the segment 98 by the zero stop pawl 65. The mechanism for accomplishing this will now be described.

Mounted on the arm 106 (Fig. 14) of the bell crank lever 103 is a stud 375 which projects into a slot in an arm 376 pivoted on the stud 295 carried by the first control bank hanger. When the differential is moved during the operation of the machine, the end 377 of the arm 376 engages the zero stop pawl 365 to stop said arm in the zero position. This disengages the latch 102 in the zero position because the stud 375 projects through the slot in the arm 376. This controls the printing mechanism so that the data will be printed in the second column.

*Mechanism for breaking the latch in the "7" or "8" position*

By referring to Fig. 36 it will be noticed that the third column is headed "Acc't No.". This column is selected for printing by the "Acc't No." key 72, which is in the "9" position of the second control bank. The mechanism for controlling the differential of the first control bank from the "Acc't No." key will now be described.

Loosely mounted on the release shaft 60 (Fig. 14) is a lever 380, the forward end of which is held in engagement with a stud on the "Acc't No." key. The rear end of the lever 380 has pivoted thereto a link 381 which is pivoted to an arm 382 at its lower end. The arm 382 is connected to an arm 383 by means of a yoke 384. The arms 382 and 383 are loosely mounted on a shaft 385. The lever 380 is held in engagement with a stud on the "Acct No." key by means of a spring 386. The arm 376 has two wings 378, each having two series of eight holes 387. The object of these holes will be hereinafter described. Secured in one of these holes 387 is a stud 388. When the "Acc't No." key 72 is depressed, the lever 380 is rocked counter-clockwise and, through the link 381 and arm 382, rocks the arm 383 in counter-clockwise direction to position a notched end 389 thereon in the path of the stud 388. When the machine is operated, the stud 388 engages the notch 389 to stop the arm 376 in a position to disengage the latch 102 from the segment 98 in the "7" position.

The plurality of holes 387 are provided so that a stud 388 may be located in any one of the positions, depending on where it is desired to disengage the latch. The object of the construction is to provide a standard arm 376 which may be fitted into any system to which the machine might be adapted. The stud 388 for the machine as disclosed herein is located in the hole 387 for disengaging the latch in the "7" position, because it is desired to print the account number in the third column.

Figure 4:
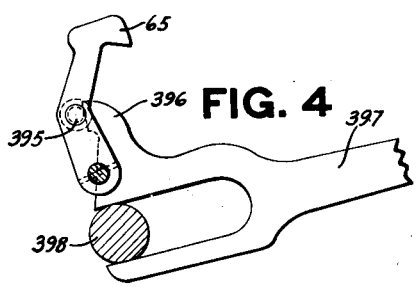
Fig. 4 is a detail view showing the zero stop pawl of the first control bank and a part of the mechanism for controlling it by the second control bank.
Figure 5:
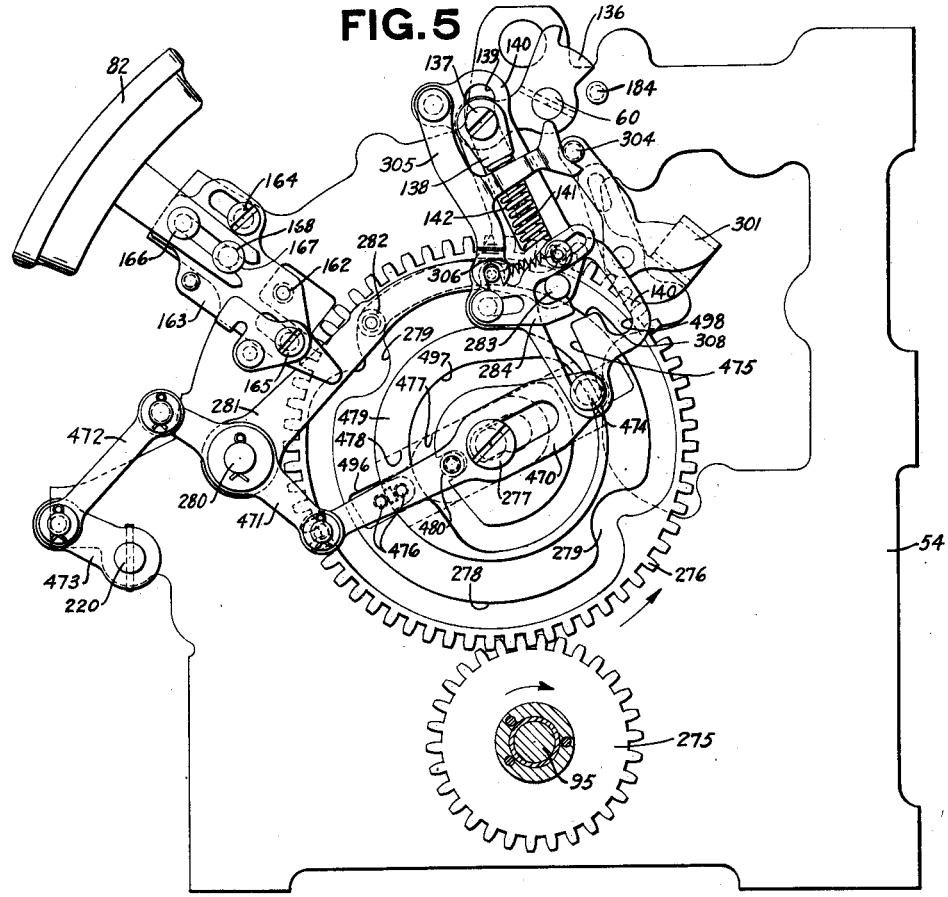
Fig. 5 is a cross section of the machine taken to the right of the main motor bar, showing the mechanism for releasing the amount keys and the mechanism for giving the machine two cycles of operation during total taking operations.
Figure 6:
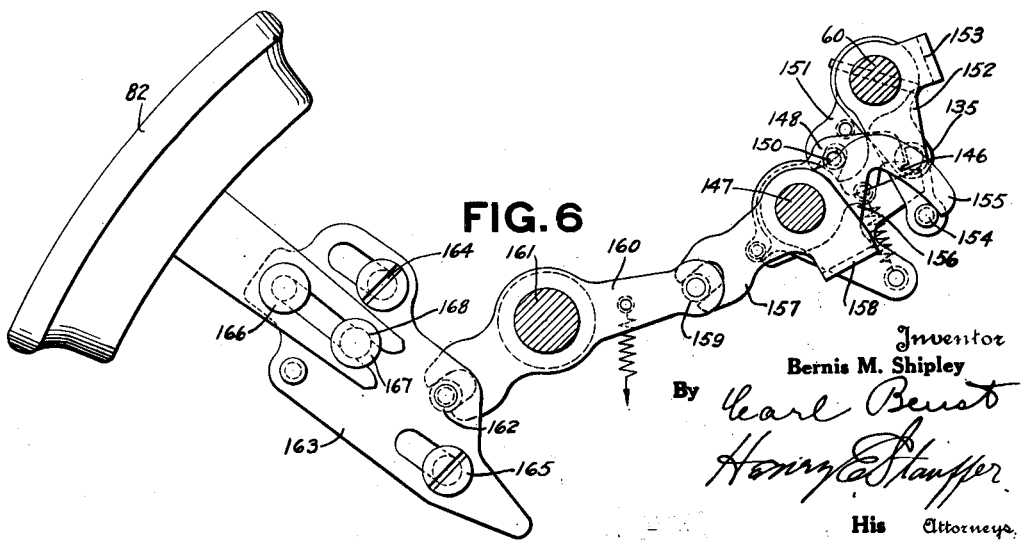
Fig. 6 is an enlarged detail view of the machine release mechanism.

Before the latch 102 can be moved to the "7" position, as just described, it is necessary to rock the zero stop pawl 65 of the first control bank to its ineffective position, under the control of the "Acc't No." key in the second control bank. This mechanism will now be described. Secured to the side of the zero stop pawl 65 is a stud 395 (Fig. 4) which is engaged by an upwardly projecting arm 396 of a pitman 397. The pitman is supported at its forward end by a rod 398 and at its rearward end it is connected to an arm 399 (Fig. 14), loosely mounted on the shaft 385. The arm 399 has a forwardly projecting lug 400 held in engagement with the yoke 384 by a spring 401 stretched between a stud on the pitman 397 and a stud on the differential hanger. When the "Acc't No." key is depressed, it rocks the arm 382 counter-clockwise, as above described, and rocks the yoke 384 and arm 399 in counter-clockwise direction, to move the pitman 397 in a forward direction. The arm 396 of the pitman 397 rocks the zero stop pawl 65 to its ineffective position, and thereby permits the differential mechanism to be moved until the stud 388 on the arm 376 engages the notch 389 of the arm 383, as above described.

In Fig. 40, the columns of printing are designated "1st", "2nd", "3rd" and "4th" and these positions correspond to the "1st", "2nd", "3rd" and "4th" columns of the card 348 (Fig. 36). The amount 35, which represents the amount entered into the totalizer by depressing the "correction" bar 70 after the totalizer has been overdrawn, is printed in the 3rd column under the account number. The selection of this column is under the control of the "correction" bar, which is in the "8" position. When the "correction" bar is depressed, the zero stop pawl 65 in the first control bank is rocked to its ineffective position in the usual and well known manner, and the latch is disengaged by the end of the "correction" bar, and in this manner selects the "8" position, and thereby the third column for printing.

*Means for disengaging the latch in "2" or "5" position*

The mechanism for disengaging the latch 102 of the first control bank, in the "2" position is under the control of the "copies to bundle" bar. By referring to Fig. 40, it will be seen that the amounts 35 printed when the "copies to bundle" bar 71 is operated, appear in the fourth column. When the "copies to bundle" bar is depressed, the zero stop pawl 65 is rocked to its ineffective position in the usual and well known manner, and the latch is disengaged by the end of the "copies to bundle" bar, and in this manner selects the "2" position, thus selecting the fourth column to receive the printing.

By referring to Fig. 40, it will be seen that the amount 20 is printed in the fourth column. This amount is printed during a reset operation, and therefore the differential mechanism in the first control bank is controlled by mechanism under control of the total lever 80. The mechanism for controlling the differential of the first control bank from the total lever will now be described.

Mounted in the total lever 80 is a stud 410 (Figs. 14 and 30). The stud 410 is normally engaged by a block 411 secured to the side of a lever 412 loosely mounted on the above mentioned shaft 385. The lever 412 is held in its normal position against the stud 410 by a spring 413. When the total lever 80 is moved into the first or balance position (Fig. 2), either up or down, the lever 412 is rocked in clockwise direction to rock a stop 414, mounted on a downwardly projecting arm 415 of the lever 412 into the path of a notch 416 on the lower wing 378 of the arm 376. The notch 416 is located a sufficient distance from the stop 414 so that the arm 376 is stopped when the differential mechanism reaches the "5" position. This disengages the latch 102 and thereby selects the fourth column for printing.

Another means for stopping the arm 376 under control of the total lever is provided. In the present application the mechanism which is about to be described stops the arm 376 in the "5" position, which is the same position in which it is stopped when moving the total lever 80 to its first position up or down, as just described. This mechanism is operated when moving the total lever to the second or third positions up or down. In some machines it is desired to select a different column for printing when the lever is moved to the second or third position from that selected when moved to the first position up or down.

Secured to the side of the lever 412 is a stop 420 (Figs. 14, 29 and 30). When the total lever is moved past the first position, either up or down, the stud 410 is moved from beneath the block 411 on the lever 412, thereby permitting the spring 413 to rock the lever until a stud 421 engages the hanger 209, as shown in Fig. 29. When the lever 412 has been moved to this position by the spring 413, the stop 420 is in the path of a notch 422 in the upper wing 378 of the arm 376. When the machine is operated with the total lever in the second or third position, either up or down, the arm 376 is stopped in the "5" position. However in those machines where it is desired to disengage the latch in other positions to select these columns for printing, all that is necessary is to notch the wing according to the desired position.

Before the differential mechanism is free to move to permit the shoulder 422 to stop against the stop 420, or the shoulder 416 against the stop 414, it is necessary to rock the zero stop pawl to its ineffective position. The mechanism for accomplishing this is best shown in Figs. 14 and 15. Secured to the shaft 220 is an arm 425, which engages the above mentioned spring stud 370 on the arm 366. When the total lever 80 is moved out of the add position, the shaft 220 is given a clockwise movement by mechanism to be hereinafter described. This clockwise movement rocks the arm 425 clockwise to rock the zero stop pawl 65 to its ineffective position, thereby permitting the differential to be controlled by either of the stops 420 or 414 as above described.

SPECIAL COUNTERS

The machine is provided with three special counters of the well known type used in machines of this character, and a complete description of them may be had by referring to the above mentioned patent to Fuller, issued October 18, 1921, No. 1,394,256. In the present application novel means is provided for turning a special counter to zero. Only enough of the counter operating mechanism will be described herein to illustrate its use in the present system. While the mechanism disclosed was primarily intended for turning a plurality of counters to zero, in the present machine only one counter is necessary to illustrate the system used, and therefore only one counter is shown, but it is not intended to limit the invention to one counter as others may be added when required by other systems which the present machine is well adapted to handle. This mechanism is used herein to facilitate the rapid return to zero of one of the counters which must be returned to zero at the end of each transaction. This counter is used for counting the number of labels for a given transaction and is designated "Shipment" in Fig. 24. In addition to this counter, there are two other counters provided, one for counting the number of so-called "spoiled labels". This label is printed when adding an amount into the adding and subtracting totalizer after the totalizer has been overdrawn, as above described. This label is not used for a shipping label because the operation during which this label has been produced is an extra operation necessitated by the fact that the adding and subtracting totalizer had to be corrected, and therefore an extra operation of the machine was required to complete the operation.

Figure 24:
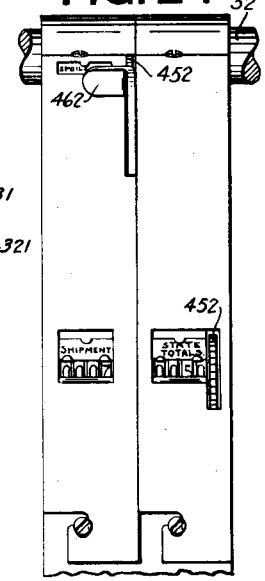
Fig. 24 is a front elevation of the special counters.
Figure 25:
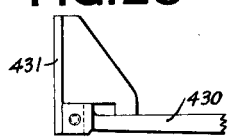
Fig. 25 is a detail view of a part of the special counter actuating mechanism.

A third special counter is designated "State totals" in Fig. 24 and is provided to count the number of bundles which have been shipped to a given section, such as a state. The mechanism for operating this special counter is controlled simultaneously with the mechanism for operating the "shipment" counter, and these two counters will be described first. Secured to the cam 264 (Fig. 23) is an arm 430 which has a wide flange 431 on its outer end which is adapted to be moved into the path of a link 432 by the first control bank differential described in connection with the adding and subtracting totalizer shifting mechanism. When the "copies to bundle" bar 71 is depressed, and the machine is operated, the arm 430 positions the flange 431 into the path of the links 432 for both the "shipment" and the "State" counters. The link 432 is slidably mounted on a stud 433 in the special counter frame 434. The upper end of the link 432 has mounted thereon a stud 435 to which is pivoted a link 436, the other end of which is pivoted to an arm 437. The arm 437 carries the counter actuating pawl 438 (Fig. 28), of a usual and well known construction. The stud 435 projects into a slot 439 formed in a detent 440 carried by an arm 441 at its lower end, and by an arm 442 at its upper end. The arms 441 and 442 are carried by the counter frame 434. During each operation of the machine the arm 441 is given a clockwise movement by mechanism not shown. A complete description of this mechanism may be had by referring to the above mentioned Fuller Patent, No. 1,394,256. This clockwise movement of the arm 441 moves the detent 440 downwardly, and rocks the link 432 against the flange 431. Further movement of the detent 440 rocks the link 432 counter-clockwise with the stud 433 as a pivot and by means of the link 436 rocks the arm 437 clockwise whereby the pawl 438 operates the counter. The flange 431 is wide enough to engage the link 432 for both the "shipment" and "State" counters to add "1" on each of the counters.

The mechanism for actuating the "spoiled label" counter is substantially like that for the counters just described. The arm 430 is positioned under control of the "correction" bar 70. The position that the arm 430 assumes when operating the machine with the "correction" bar depressed is shown in Fig. 27. With the mechanism in this position, when the detent 440 is operated the link 432 engages the flange 431 and the detent operates the counter operating pawl 438 for the "spoiled label" counter by means of a special link 450 which connects the arm 437 to an auxiliary arm 451. The reason for this construction is because a stock frame 434 is used and there is not sufficient room for both the knob 452 and a clip 458, to be presently described. The "State" counter and the "spoiled label" counter are provided with the usual and well known knob 452 (Figs. 23 and 26) for turning them to zero. The "shipment" counter is provided with a special mechanism to facilitate easy turning to zero of this counter.

Secured to the turn-to-zero shaft 449 of the "shipment" counter is a pinion 453 meshing with a rack 454 supported by two studs 455 and 456 so as to be easily slid. The studs 455 and 456 are mounted on an auxiliary frame 457 (Fig. 26) carried by the special counter frame 434. The rack 454 is held in the proper lateral position by means of the two clips 458 supported at their lower ends on studs 455 and 456 at their upper ends on studs 459. Fast on a shaft 460 is a pinion 461. This pinion 461 acts as a guide for the rack 454. Also secured to the rack 454 is an arm 462 which projects through a slot in the cabinet of the machine. When it is desired to turn the "shipment" counter to zero, the operator pulls on the arm 462 until a stud 463 secured to the side of the rack 454 engages a stop 464 formed on the frame 457. This movement of the rack 454 is sufficient to cause the shaft 449 to make one complete rotation to carry all of the counter wheels of the "shipment" counter to zero in the usual and well known manner.

*Total and sub-total taking mechanism*

In order to allow sufficient time for the selection of a totalizer and the engagement of said totalizer with the actuating racks 101 (Fig. 3) when a total or sub-total is to be printed, the main drive shaft 95 is given two continuous rotations on such operations instead of one, as in adding operations. During the first rotation of the shaft 95 the selected one of the totalizers is moved into engagement with its actuating racks. During the second rotation of the shaft the engaged totalizer controls the extent of movement of the differentially movable actuating racks and hence the setting of the type wheels to print a total or sub-total on the record strip.

To permit two rotations of the shaft 95 in total and sub-total operations, the total lever 80 controls mechanism shown in Fig. 30 to prevent the restoration of the motor locking lever 185 (Fig. 32) to normal position until near the end of the second rotation. Slidably mounted on the stud 277 (Fig. 5) is a link 470, one end of which is pivoted to a lever 471 loose on the stud 280. Pivoted to the lever 471 is a link 472, also pivoted to an arm 473 fast on the shaft 220. The link 470 (Fig. 5) has a stud 474 engaging a slot 475 in the link 140. The link 470 has two pins 476, one on each side of an ear on a coupling plate 477 slidably mounted in a groove 478 in a cam 479. The link 470 also has an anti-friction roller 480 normally in engagement with a notch in the cam 479. The gear 276 has a circular depression cut therein in which the cam 479 lies. Fast on the shaft 220 is an arm 485 (Fig. 30) carrying a pin 486 projecting into a slot 487 in a lever 488 loosely mounted on a stud 489 in the machine frame. Also loose on the stud 489 is a lever 490 having an arm 491 carrying a roller 492 cooperating with a slot 493 in the total lever 80.

The movement of the total lever 80, either up or down, rocks the lever 490 counter-clockwise through the engagement of its pin 492 with the slot 493. This movement is transmitted to lever 488 through a coil spring 494 supported by projections 495 on levers 488 and 490, and moves said lever 488 counter-clockwise. This movement through pin 486 rocks arm 485 and shaft 220 clockwise. Clockwise movement of this shaft 220 rocks arm 473 clockwise (Fig. 5) whereby, through the link 472, the lever 471 is rocked clockwise and moves the link 470 to the left. This movement of the link 470, through the engagement of pins 476 with the ear on the coupling plate 477, slides said coupling plate to the left into engagement with a notch 496 in the gear 276, thus connecting said gear with the cam 479. At the same time the roller 480 is moved into a cam slot 497 in the cam 479. The movement of the link 470 also rocks the link 140 clockwise about stud 137. As the cam 479 is connected to the gear 276, the counter-clockwise movement of said gear and cam, through the cam roller 480, moves the link 470 still farther to the left and rocks the link 140 still farther. When the lever 281 is lowered near the end of the first half rotation of the gear 276 by one of the nodes 279 as described in adding operations, the stud 283 moves idly in an elongated opening 498, thus preventing the link 140 from rocking the shaft 60 to return the motor locking lever 185 (Fig. 32) to normal position. As lever 185 is not rocked to normal position the lever 187 is not locked near the end of the first rotation of shaft 95, and therefore the motor is permitted to drive the shaft 95 a second rotation.

Near the end of the complete rotation of the gear 276 the link 470 is moved to the position in which it was adjusted by the total lever 80, so that when the lever 281 is rocked clockwise the second time by the second node 279, the stud 283 engages the shoulder 308 of the link 140 to rock the arm 136 and shaft 60 counter-clockwise (Figs. 5 and 12) slightly past normal position, but not as far past normal position as in adding operations, as this movement on adding operations is to release the amount keys and during this totaling operation the detent 55 (Fig. 3) is locked against movement by mechanism which will be presently described. This movement of the shaft 60 slightly past normal position is sufficient to permit the lever 187 (Fig. 32) to position the stud 186 above the arm 185 and thereby unclutch the motor from the machine, and to release the control keys 72 or the bars 70 and 71 by moving the detents 75 downwardly in the same manner as during adding operations.

When the total lever 80 is rocked up or down, as above described, the shaft 220 is rocked clockwise, and a rod 501 (Fig. 3), carried by a plurality of arms 500 secured to the shaft 220, is positioned in front of the tails 502 of the before mentioned arms 57 thus preventing depression of an amount key 50 by preventing movement of the detents 55. Then during the operation of the machine, when the cam slot 497 gives the shaft 220 a further movement, the rod 501 engages the arms 59 to rock the zero stop pawls 65 for the amount banks to their ineffective positions, thus permitting the differential mechanism to be moved under control of the totalizer wheels during the second rotation of the shaft 95.

From this it can be seen that during a total taking operation the shaft 60 cannot be rocked past its normal position to engage the rod 61 with the projection on the arm 56 for releasing the amount keys, as during adding operations, because the rod 501 is in the path of the tail 502 of the arm 57, as just described.

*Modified form of key release mechanism*

A modified form of mechanism for releasing the amount keys is shown in Figs. 41, 42, 43 and 44. In this modified form the bars 70 and 71 are the only release keys for releasing the machine for operation, the main motor bar 82 not being used. When either of the bars 70 or 71 is depressed the stud mounted on the side thereof engages the detent 175 and moves it downwardly which movement rocks the arm 176 clockwise. This movement rocks the arm 189 (Fig. 43) and by means of the projection 192 rocks the arm 194 in clockwise direction. The arm 194 rocks the arm 195 by means of a cross bar 196. The arm 195 rocks the bifurcated arm 151 (Fig. 42) by means of the stud 197 mounted thereon and thereby disengages the pawl 148 from the stud 146. This permits the release shaft 30 to be rocked clockwise to release the machine in the same manner as in the construction previously described. The only difference between the release mechanism of the machine as first described and the modification is that only the pawl 148 is used in the modification, the pawl 145 being omitted, and therefore all that is necessary to release the machine is to depress one of the bars 70 or 71, as just described.

*Amount key releasing mechanism*

In the form of the invention first described the mechanism for releasing the amount keys 50 is normally in its effective position. In the modification this mechanism is normally in its ineffective position. If the machine is released by depressing the bar 71, the mechanism is left in its ineffective position and therefore the amount keys, which are depressed during this operation of the machine, are not released. The mechanism for rendering the releasing mechanism effective is under control of the bar 70 and will now be described.

Mounted on the side of the bar 70 (Figs. 41 and 44) is a long stud 510 which engages an arm 511 secured to a shaft 512 loosely mounted in two downwardly projecting lugs 513 carried by a frame 514 which acts as a guide for the total lever 80. Also secured to the shaft 512 is an arm 515 carrying a stud 516 lying in the path of a pawl 517. The pawl 517 is pivoted on the before mentioned link 140 and is held in engagement with a stud 518 by a spring 519. When the bar 70 is depressed, the stud 510 thereon rocks the arms 511 and 515 counter-clockwise, which, through the stud 516, rocks the end 520 of the pawl 517 beneath the before mentioned stud 283 on the lever 281. When the node 279 of the cam 276 rocks the lever 281 in clockwise direction, as described when considering the first described machine, the stud 283 engages the rod 61 with the arm 56 and thereby moves the studs on the detent 55 from the shoulders on the amount keys 50 to permit the amount keys to be released.

*Operation*

For the purpose of a better understanding of the machine as herein disclosed, the various operations required for entering the transaction assumed in the example, will be given. In this example, 230 posts of April 5, 1924, issue were ordered at a cost of $6.90. The posts were charged to account No. 54321. The date of entry was April 2nd, and the date upon which a settlement is due is June 18th. The weight limits the bundles to 35 copies.

The first operation necessary is to enter the total amount of the order into the positive side or adding wheels 229 of an adding and subtracting totalizer. This is done by pressing the amount keys 50 (Figs. 1 and 2), the control keys 72 corresponding to the publication, and releasing the machine by depressing the main motor bar 82. During this operation of the machine, the total number of the publications, in this instance 230, and the character, "P.C.", designating the kind of publications is printed on the shipping label 350 (Fig. 37), on the audit strip (Fig. 40) and on the ledger card 348 (Fig. 36). The date "Apr. 5, 24" is set up by the regular date knobs 522 (Fig. 1).

During the second operation of the machine, the shipping label is again inserted in the machine, and the amount $6.90 of cash involved in the transaction is set up on the keyboard, the "post money" key 72 depressed, and the machine released by the depressing of the main motor bar 82. During this operation the amount is added into a totalizer 112 under control of a "post money" key, and the amount $6.90 together with a character "P.C.", designating the kind of transaction is printed on the ledger card 348 and on the audit strip.

The third operation is for the purpose of printing the account number 54321, which is set up on the amount keyboard, the date of entry 4—2 and the date of settlement 6—18 which are set up on the keyboard (Fig. 1) on the right-hand end of the machine, on the ledger card 348 and the audit strip. During this operation of the machine, the machine is released by depressing the main motor bar 82.

During the fourth operation of the machine, the label 350 is again inserted into the machine and the amount of publications per bundle in this instance 35, set up on the amount keyboard, and the machine is released by depressing the "copies to bundle" bar 71. During this transaction, the number of copies per bundle is printed on the shipping label 350, ledger card 348 and audit strip.

The "copies to bundle" bar 71 selects the subtracting wheels 225 of the adding and subtracting totalizer, and controls the key releasing mechanism so that the depressed keys 50 are not released at the end of this operation.

During the next succeeding operations, all the operator need do is to insert another shipping label (Fig. 38) into the machine and depress the "copies to bundle" bar 71 to release the machine for each operation. During each of these several operations, in this instance eight, wherein the machine is released by depression of the "copies to bundle" bar 71, the amount set up on the keys 50, in this case 35, is added to the subtracting wheel 225, thus deducting "35" from the adding wheel 229 upon each operation. After the totalizer has been overdrawn, this bar is automatically locked against operation. In the example assumed in the present application, the totalizer overdraws during the tenth operation of the machine. During this operation the "correction" bar 70 is automatically unlocked so that the machine can be released for the next operation by depressing this bar.

In the eleventh operation no label is inserted in the machine, and the machine is released by means of the "correction" bar 70, which selects the adding wheels 229 of the adding and subtracting totalizer. During this operation the number 35 as represented by the depressed amount keys 50 is added back into the adding and subtracting totalizer, and at the end of the operation these depressed keys are released. This releasing mechanism is under the control of the "correction" bar 70. During this operation the printing is controlled so that the amount "35" is printed on the audit strip only.

During the twelfth operation the adding and subtracting totalizer is reset to zero and the amount "20", standing on the totalizer is printed on the last shipping label 350 (Fig. 39) for the particular order and on the audit strip. Before this operation the total lever 80 is moved to its first position below the "add" position, and the machine released by depressing the main motor bar 82.

During the thirteenth operation the last shipping label 350 (Fig. 39) is again inserted into the machine, the amount "230" of publications to be shipped set up on the keyboard, and the "post shipped" key 72 depressed, and the machine released by depressing the main motor bar 82. During this operation this data is printed on the last shipping label and on the audit strip.

The machine is provided with a special counter which adds one during every operation of the machine during which the "copies to bundle" bar is depressed. This adds the number of bundles which makes up the shipment. During the fourteenth operation of the machine the operator sets up, on the amount keyboard, the number of bundles as read from this special "shipment" counter, depresses the "post labels" control key 72, and releases the machine by depressing the main motor bar 82. This prints the total number, "7", of bundles to the shipment on the last shipping label and on the audit strip. The issue date "Apr. 5, 24" is also printed on all shipping labels.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In a normally locked machine of the class described, the combination of a totalizer, a manipulative device adapted to release the machine for entering amounts into the totalizer when the totalizer is standing at zero or has an amount accumulated thereon, a manipulative device adapted to release the machine for entering amounts into the totalizer when the totalizer has been overdrawn, a manipulative device adapted to release the machine for subtracting amounts from the totalizer when the totalizer is standing at zero or has an amount accumulated thereon, and means for determining the effectivity of all of said devices under control of said totalizer.

2. In a machine of the class described, the combination of a machine releasing mechanism, an adding and subtracting totalizer, a manipulative device for tripping said releasing mechanism for adding operations, a manipulative device for tripping said releasing mechanism for subtracting operations, a manipulative device for tripping said releasing mechanism for adding operations after the totalizer has been overdrawn, a cam operated by said totalizer, means adapted to be moved under control of said cam when said totalizer is being overdrawn to render said machine releasing mechanism inoperative thereby rendering said first and second mentioned manipulative devices ineffective, and means adapted to be moved by the third mentioned manipulative device to move the first mentioned means to render said releasing mechanism operative.

3. In a machine of the class described, the combination of a machine releasing mechanism, an adding and subtracting totalizer, a manipulative device for tripping said releasing mechanism for adding operations, a manipulative device for tripping said releasing mechanism for subtracting operations, a manipulative device for tripping said releasing mechanism for adding operations after the totalizer has been overdrawn, means adapted to be moved when said totalizer is being overdrawn to render said machine releasing mechanism inoperative thereby rendering said first and second mentioned manipulative devices ineffective, and a lever adapted to be moved by the third mentioned manipulative device to actuate said means to render said releasing mechanism operative.

4. In a machine of the class described, the combination of a machine releasing mechanism, an adding and subtracting totalizer, a manipulative device for tripping said releasing mechanism for adding operations, a manipulative device for tripping said releasing mechanism for subtracting operations, a manipulative device for tripping said releasing mechanism for adding operations after the totalizer has been overdrawn, means adapted to be adjusted by said totalizer when said totalizer is being overdrawn, an arm adapted to be adjusted after said means has been adjusted to render said machine releasing mechanism inoperative thereby rendering said first and second mentioned manipulative devices ineffective, and a lever adapted to be moved by the third mentioned manipulaltive device to adjust said arm to render said releasing mechanism operative.

5. In a machine of the class described, the combination of a machine releasing mechanism, an adding and subtracting totalizer, a manipulative device for tripping said releasing mechanism for adding operations, a manipulative device for tripping said releasing mechanism for subtracting operations, a manipulative device for tripping said releasing mechanism for adding operations after the totalizer has been overdrawn, a cam on said totalizer, an arm adapted to be moved by said cam when said totalizer is being overdrawn, a member secured to said arm and adapted to be moved therewith, means adapted to cooperate with said releasing mechanism to prevent movement thereof, but normally held in an ineffective position by said member and adapted to be adjusted to an effective position when released from the member upon movement of said member to render said machine releasing mechanism inoperative, thereby rendering said first and second mentioned manipulative devices ineffective, and a lever adapted to be moved by the third mentioned manipulative device to adjust said means to its ineffective position to render said releasing mechanism operative.

6. In a machine of the class described, the combination of a totalizer, a plurality of value determining devices for entering amounts into or subtracting amounts from said totalizer, means for releasing said value determining devices after an amount has been entered into said totalizer, a manipulative means adapted to control said releasing means to render it ineffective when subtracting amounts from said totalizer, said manipulative means being adapted to select the subtracting side of the totalizer, mechanism for rendering said manipulative means ineffective when the totalizer is overdrawn, and another manipulative means to cause re-entry of the amount represented by the depressed value determining devices into the totalizer, and to render said mechanism ineffective.

7. In a machine of the class described, the combination of a totalizer, a normally locked oscillating means for releasing the machine, a manipulative device for releasing said means and for causing amounts to be entered into said totalizer, a manipulative device for releasing said means and for causing amounts to be subtracted from said totalizer, a stop controlled by said totalizer for preventing said means from oscillating when the totalizer has been overdrawn, and means operated by said first mentioned device for removing said normally locked oscillating stop and thereby permitting said means to oscillate.

8. In a machine of the class described, the combination of a totalizer, a plurality of depressible keys for entering amounts into or subtracting amounts from said totalizer, devices to maintain the keys depressed, means to actuate the devices for releasing said depressible keys during adding operations of the machine, means for rendering said releasing mechanism inoperative during subtracting operations of the machine, and means for preventing release of said depressible keys until after the totalizer has been overdrawn.

9. In a machine of the class described, the combination of a totalizer, a plurality of manipulative devices for entering amounts into or subtracting amounts from said totalizer, means for releasing said manipulative devices when amounts are entered into said totalizer, means for rendering said manipulative device releasing mechanism inoperative when subtracting amounts from said totalizer, and means controlled by said totalizer for preventing subtracting operations after the totalizer has been overdrawn.

10. In a machine of the class described, the combination of a totalizer, a plurality of manipulative devices for entering amounts into or subtracting amounts from said totalizer, means for releasing said manipulative devices, and means for automatically rendering said releasing means inoperative only during subtracting operations of the machine.

11. In a machine of the class described, the combination of a totalizer, a plurality of manipulative devices for entering amounts into or subtracting amounts from said totalizer, a normally operative means for releasing said manipulative devices during an adding operation of the machine, a manipulative device for controlling the machine for subtracting operations, and a device operable by said last-named manipulative device for rendering said releasing mechanism inoperative.

12. In a machine of the class described, the combination of a totalizer, a plurality of manipulative devices for entering amounts into or subtracting amounts from said totalizers, a normally operative means for releasing said manipulative devices during an operation of the machine, a manipulative device for controlling the machine for subtracting operations, a member for rendering said releasing mechanism inoperative, and means interposed between said member and said last mentioned manipulative device for operating said member whereby the releasing means will be rendered inoperative.

13. In a machine of the class described, the combination of a totalizer, a plurality of manipulative devices for entering amounts into or subtracting amounts from said totalizer, a normally operative means for releasing said manipulative devices during an operation of the machine, a manipulative device for controlling the machine for subtracting operations, a rockable member cooperating with said last mentioned manipulative device, a two armed member adapted to be operated by said rockable member, and a device cooperating with said two armed member for rendering said releasing mechanism inoperative.

14. In a machine of the class described, the combination of a totalizer having one position for adding operations and another for subtracting operations, a plurality of manipulative devices for entering amounts into or subtracting amounts from said totalizer, a rockable member for releasing said manipulative devices during an amount entering operation, and a single manipulative means controlling the positioning of the totalizer for subtracting operations and for simultaneously rendering said rockable member inoperative.

15. In a machine of the class described, the combination of a totalizer, a plurality of manipulative devices for entering amounts into or subtracting amounts from said totalizer, a shaft for releasing said manipulative devices when entering amounts into said totalizer, an arm on said shaft, a member adapted to receive an oscillating movement during each operation of the machine, means for operatively connecting said member to said arm, and means for shifting the connecting means to disconnect said member from said arm automatically during all subtracting operations and thereby preventing the release of the manipulative devices.

16. In a machine of the class described, the combination of a totalizer, a plurality of manipulative devices for entering amounts into or subtracting amounts from said totalizer, a shaft for releasing said manipulative devices, an arm on said shaft, a member adapted to receive an oscillating movement during each operation of the machine, a link interposed between said arm and said member, a latch slidably mounted on said link for operatively connecting said arm to said member, a manipulative device for controlling the machine for subtracting operations, and means operated by said manipulative device for disconnecting said arm from said member during subtracting operations.

17. In a machine of the class described, the combination of a totalizer, a plurality of manipulative devices for entering amounts into or subtracting amounts from said totalizer, a shaft for releasing said manipulative devices, an arm on said shaft, a member adapted to receive an oscillating movement during each operation of the machine, a link interposed between said arm and said member, a latch slidably mounted on said link for operatively connecting said arm to said member, a manipulative device for controlling the machine for subtracting operations, a rockable member cooperating with said manipulative device, and a two armed member adapted to be operated by said rockable member for disconnecting said arm from said member during subtracting operations.

18. In a machine of the class described, the combination of manipulative devices, a movable member adapted to release said devices during an operation of the machine, a fixed abutment on said movable member, a movable abutment on said movable member, said movable member adapted to release all of said manipulative devices by means of said movable abutment and adapted to release only certain of said manipulative devices by means of said fixed abutment, and means for shifting said movable abutment to its ineffective position thereby permitting the fixed abutment to function.

19. In a machine of the class described, the combination of manipulative devices, a movable member adapted to release said devices during an operation of the machine, a fixed abutment on said movable member, a movable abutment on said movable member, said movable member adapted to release all of said manipulative devices by means of said movable abutment and adapted to release only certain of said manipulative devices by means of said fixed abutment, means for shifting said movable abutment to its ineffective position thereby permitting the fixed abutment to function, and a machine release device for controlling said means.

20. In a machine of the class described, the combination of a plurality of totalizers, manipulative devices for determining the amounts to be entered into said totalizers, manipulative devices for selecting the totalizers for operations, a movable member, a fixed abutment on said movable member, a movable abutment on said movable member, said movable member adapted to release all of said manipulative devices by means of said movable abutment but adapted to release only the manipulative devices for selecting the totalizers by means of said fixed abutment, means for shifting said movable abutment to its ineffective position thereby permitting the fixed abutment to function, and a machine release device for controlling said means.

21. In a machine of the class described, the combination of an adding and subtracting totalizer; a manipulative device for releasing the machine to subtract amounts from the totalizer; means controlled by the totalizer to render the manipulative device ineffective, thus preventing the release of the machine by said device, when the totalizer is overdrawn; and means operable only when the totalizer is overdrawn, to release the machine to automatically enter into the totalizer the last amount subtracted, to render the first mentioned means ineffective.

22. In a machine of the class described, the combination of an adding and subtracting totalizer; a manipulative device for releasing the machine for subtracting amounts from the totalizer; a normally inoperable manipulative means to release the machine to automatically add into the totalizer the last amount subtracted when the totalizer is overdrawn; and means operated directly by the totalizer as it is being overdrawn to render the first-mentioned manipulative means ineffective, and for simultaneously rendering the second-mentioned manipulative means operable.

23. In a normally locked machine of the class described, the combination of amount determining devices adapted when operated to be retained in operated positions, means to release the devices at the ends of certain operations of the machine, a differential mechanism to control the machine to perform a plurality of kinds of operations, a manipulative device for controlling said differential mechanism whereby the machine performs a certain one of its kinds of operation, machine releasing mechanism adapted to be controlled by said manipulative device, and means controlled by the manipulative device for controlling the amount determining device release means so that said amount determining devices will not be released at the end of the operation of the machine during which the machine performs said certain one of its kinds of operation.

24. In a normally locked machine of the class described, the combination of an adding and subtracting totalizer; machine releasing means; a plurality of manipulative devices to control the totalizer for adding and subtracting amounts of variable values, said devices also adapted to operate the releasing means; and means to render one of said devices operative only when the totalizer is overdrawn.

25. In a machine of the class described, the combination with an adding and subtracting totalizer, a plurality of value-determining devices for controlling the entry of amounts into or subtracting amounts from the totalizer, a rockable shaft for releasing the value-determining means, and means for rocking the shaft to release the keys only when adding amounts into the totalizer, said means being normally ineffective to rock the shaft and adapted to be rendered effective only upon conditioning the machine for adding operations.

26. In a machine of the class described, the combination of an adding and subtracting totalizer; a plurality of value-determining means for entering amounts into or subtracting amounts from the totalizer; means for releasing the value-determining means only when adding amounts into the totalizers, said means being normally ineffective; a manipulative device for controlling the machine for adding operations; and a member operable by said manipulative device to render the releasing means effective.

27. In a machine of the class described, the combination of an adding and subtracting totalizer; a plurality of value-determining means for entering amounts into and subtracting amounts from the totalizer; a rockable member for releasing said device, said rockable member being normally ineffective; and a means to condition the totalizer for adding amounts into and simultaneously rendering the rockable member effective to release the value-determining means.

28. In a machine of the class described, the combination of an adding and subtracting totalizer, a plurality of value-determining means for entering amounts into and subtracting amounts from said totalizer, a shaft for releasing said manipulative devices after entering amounts into the totalizer, an arm on said shaft, a member adapted to receive an oscillating movement during each operation of the machine, and means for operatively connecting said member to said arm only during adding operations and thereby releasing said manipulative devices only during adding operations.

29. In a machine of the class described, the combination of an adding and subtracting totalizer; a plurality of value-determining means for entering amounts into or subtracting amounts from said totalizer; a shaft for releasing said manipulative devices; an arm on said shaft; a member adapted to receive an oscillating movement during each operation of the machine; a link interposed between said arm and said member; a latch pivotally mounted on said link, normally ineffective and adapted to be moved to operatively connect said arm to said member, a manipulative device for controlling the machine for adding operations, and means operated by said manipulative device for moving the latch from its normal ineffective position to connect said arm to said member for adding operations only.

30. In a machine of the class described, the combination of an adding and subtracting totalizer, a plurality of value-determining means for entering amounts into or subtracting amounts from said totalizer, a shaft for releasing said manipulative devices, an arm on said shaft, a member adapted to receive an oscillating movement during each operation of the machine, a link interposed between said arm and said member, a latch pivotally mounted on said link for operatively connecting said arm to said member, and a manipulative device for controlling the machine for adding operations, and a rockable member cooperating with said manipulative device and said latch for connecting said arm to said member for adding operations only.

31. In a normally locked machine of the class described, the combination of an adding and subtracting totalizer, a manipulative device to release the machine and condition the machine for subtracting amounts from the totalizer, means controlled by the totalizer when the totalizer is overdrawn to render the manipulative device ineffective to release the machine, another manipulative device to release the machine and condition the machine to automatically reenter into the totalizer the amount subtracted therefrom when the totalizer was overdrawn, an element to lock the second-mentioned manipulative device when a positive amount is on the totalizer, and means controlled by the totalizer as the totalizer is overdrawn to render the element ineffective, thus rendering the second-named manipulative device operable only after the totalizer is overdrawn under control of the first-named manipulative device.

32. In a normally locked machine of the class described, the combination of an adding and subtracting totalizer, a manipulative device for releasing the machine for subtracting operations, said device operable to release the machine only when said totalizer has an amount accumulated therein or is standing at zero, a manipulative device for releasing the machine for adding operations, an element to lock the last-named device when a positive amount is on the totalizer, and means controlled by the totalizer as the totalizer is overdrawn to render the element ineffective thus rendering said second-mentioned device effective only when the totalizer has been overdrawn under control of the first-mentioned manipulative device.

33. In a normally locked machine of the class described, the combination of means for releasing the machine, a totalizer, a pair of devices for tripping the releasing means, means to render one of said devices inoperative until the totalizer has been overdrawn under control of the other device, and means to render the other device effective only when the totalizer is at zero or has an amount accumulated thereon.

34. In a normally locked machine of the class described, the combination of a totalizer, machine releasing means, a plurality of manipulative devices for tripping said releasing means, means to render one of said manipulative devices inoperative until the totalizer has been overdrawn under control of the other manipulative device.

35. In a normally locked machine of the class described, the combination of an adding and subtracting totalizer, machine releasing means, a plurality of manipulative devices for tripping said releasing means, means controlled by said devices to condition the machine for adding amounts into, or subtracting amounts from, the totalizer, and means controlled by the totalizer to render one of said devices effective when the totalizer is standing at zero or an amount has been accumulated thereon, and to render one of said devices operative only when the totalizer has been overdrawn under control of the other device.

36. In a normally locked machine of the class described, the combination of a totalizer, a plurality of manipulative devices to release the machine and to condition the machine for adding or subtracting, and means, adjusted by the totalizer during the machine operation, to control the effectivity of said devices to release the machine for the next succeeding operation.

37. In a machine of the class described, the combination of a totalizer, a plurality of manipulative devices for entering amounts into or subtracting amounts from said totalizer, a rockable shaft for releasing said manipulative devices, automatic means operable as an incident to adding operations for rocking said shaft to release the manipulative devices, and automatic means operable only as an incident to subtracting operations for disabling said means for rocking said shaft to thereby prevent release of the manipulative device only when subtracting.

In testimony whereof I affix my signature.

BERNIS M. SHIPLEY.

CERTIFICATE OF CORRECTION.

Patent No. 1,916,535.  July 4, 1933.

BERNIS M. SHIPLEY.

It is hereby certified that error appears in the printed specification of the above numbered patent requiring correction as follows: Page 5, line 110, for "clips" read "shoulders of the pilot arms"; page 8, line 70, for "wheels" read "wheel"; page 18, line 76, claim 7, strike out the words "normally locked "oscillating" and insert the same after "said" in line 77; and that the said Letters Patent should be read with these corrections therein that the same may conform to the record of the case in the Patent Office.

Signed and sealed this 22nd day of August, A. D. 1933.

M. J. Moore.

(Seal)  Acting Commissioner of Patents.